United States Patent
Inoue et al.

(10) Patent No.: US 7,136,140 B1
(45) Date of Patent: Nov. 14, 2006

(54) LIQUID CRYSTAL DISPLAY COMPRISING A LINEAR PROTRUSION STRUCTURE AND AN AUXILLIARY PROTRUSION STRUCTURE HAVING A WIDTH WIDER THAN THAT OF THE LINEAR PROTRUSION STRUCTURE FOR CONTROLLING AN ALIGNMENT OF LIQUID CRYSTAL

(75) Inventors: Hiroyasu Inoue, Kawasaki (JP); Yoji Taniguchi, Kawasaki (JP); Yoshinori Tanaka, Kawasaki (JP); Takahiro Sasaki, Kawasaki (JP); Kenji Okamoto, Kawasaki (JP); Minoru Otani, Kawasaki (JP); Manabu Sawasaki, Kawasaki (JP); Tetsuya Fujikawa, Kawasaki (JP); Shougo Hayashi, Kawasaki (JP); Kazuhiko Sumi, Yonago (JP); Tomonori Tanose, Yonago (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/611,846

(22) Filed: Jul. 7, 2000

(30) Foreign Application Priority Data

Jul. 9, 1999 (JP) .................................. 11-196736
Dec. 28, 1999 (JP) .................................. 11-373132

(51) Int. Cl.
    *G02F 1/1337* (2006.01)
(52) U.S. Cl. ....................... 349/191; 349/130; 349/178
(58) Field of Classification Search ................. 349/139, 349/143, 123–125, 178, 122, 191, 128–130, 349/94
    See application file for complete search history.

(56) References Cited

U.S. PATENT DOCUMENTS

| 5,459,595 | A | 10/1995 | Ishiguro et al. ............... 359/59 |
| 5,673,092 | A | 9/1997 | Horie et al. ................... 349/86 |
| 5,959,707 | A | 9/1999 | Murai et al. ................ 349/129 |
| 6,031,593 | A | 2/2000 | Morikawa et al. .......... 349/155 |
| 6,061,117 | A | 5/2000 | Horie et al. ................ 349/156 |
| 6,285,431 | B1 | 9/2001 | Lyu et al. |
| 6,424,397 | B1 * | 7/2002 | Kuo |
| 6,567,144 | B1 | 5/2003 | Kim et al. |

FOREIGN PATENT DOCUMENTS

EP        0884626        12/1998

(Continued)

*Primary Examiner*—Dung T. Nguyen
*Assistant Examiner*—Thoi V. Duong
(74) *Attorney, Agent, or Firm*—Greer, Burns & Crain, Ltd.

(57) ABSTRACT

An MVA liquid crystal display which is high in brightness and has preferable characteristics is provided. Further, the MVA liquid crystal display with a preferable display quality as well as a larger margin in fabrication and a higher yield is provided. A first substrate having a first electrode, a second substrate having a second electrode corresponding to a display pixel, the liquid crystal having negative dielectric anisotropy sealed between the first and the second substrates, and a structure which is provided on each of the first and the second substrate to control an alignment of the liquid crystal are provided. The structure in the first substrate has a linear protrusion structure and provides at least two auxiliary protrusion structures opposing to each end portion facing to the second electrode extending from a protrusion structure provided and the width between the two auxiliary protrusions and the opposing second electrode is more than 6 μm respectively.

1 Claim, 35 Drawing Sheets

FOREIGN PATENT DOCUMENTS

| | | |
|---|---|---|
| JP | 06-148636 | 3/1994 |
| JP | 08-194431 | 7/1996 |
| JP | 09-15589 | 1/1997 |
| JP | 10-186367 | 7/1998 |
| JP | 11-38906 | 2/1999 |

\* cited by examiner

LIQUID CRYSTAL DISPLAY COMPRISING A LINEAR PROTRUSION STRUCTURE AND AN AUXILLIARY PROTRUSION STRUCTURE HAVING A WIDTH WIDER THAN THAT OF THE LINEAR PROTRUSION STRUCTURE FOR CONTROLLING AN ALIGNMENT OF LIQUID CRYSTAL

BACKGROUND OF THE INVENTION

1. Field of the Invention

The present invention relates to a liquid crystal display for a television, display and the like and its fabrication method. Specifically, the present invention relates to a liquid crystal display containing a vertical alignment liquid crystal with large viewing angle and its fabrication method.

2. Description of the Related Art

The liquid crystal display contains the liquid crystal inserted between a pair of substrates. Each of the pair of substrates has an electrode and an alignment film. A TN (Twisted Nematic) mode liquid crystal display widely used in the past contains the liquid crystal having a horizontal alignment film and positive dielectric anisotropy, and when no voltage is applied, the liquid crystal is aligned substantially parallel to the horizontal alignment film. When voltage is applied, the liquid crystal arises in the direction substantially perpendicular to the horizontal alignment film.

Although the TN mode liquid crystal display has advantages such as a capability of miniaturization, the TN mode liquid crystal display has disadvantages that, first, the viewing angle is narrow and, second, contrast is low. As a method to improve the first disadvantage and to obtain the larger viewing angle, there is an alignment division. According to the alignment division, a single pixel is divided into two areas and the liquid crystal is made to arise and lie down to one direction in one area while the liquid crystal is made to arise and lie down to the other direction in the other area, thereby forming the areas with different viewing angle characteristics within a single pixel. When observed as a whole, the viewing angle characteristics are leveled and a larger viewing angle is obtained.

In order to control the alignment of the liquid crystal, rubbing is usually performed on the alignment film. When domain dividing is performed, one area of the single pixel is rubbed in a first direction by using a mask and the other area of the single pixel is rubbed in a second direction which is the opposite direction from the first direction by using a complementary mask. In another way, the whole alignment film may be rubbed in the first direction and ultraviolet irradiation is selectively performed in one area or in the other area of the single pixel by using the mask, thereby creating a difference in pre-tilt in the liquid crystal between one area and the other area.

Since the liquid crystal display using the horizontal alignment film requires rubbing, damages generated by contamination or static electricity occurring during the rubbing process is a main cause of reduction in yield.

On the other hand, in a VA (Vertically Aligned) mode liquid crystal display using the vertical alignment film, when no voltage is applied, the liquid crystal is aligned substantially perpendicular to the vertical alignment film and when voltage is applied, the liquid crystal lies down in the horizontal direction to the vertical alignment film. In this way, high contrast is obtained and the low contrast, which is the second disadvantage of the TN mode liquid crystal display above, is eliminated. However, rubbing is also normally performed on the alignment film to control the alignment of the liquid crystal in the general VA mode liquid crystal display using the vertical alignment film.

The Japanese Patent Application No. 10-185836 by the applicant of this application proposed a liquid crystal display which can control the alignment of the liquid crystal without rubbing. This liquid crystal display is a VA mode liquid crystal display having the vertical alignment film and the liquid crystal with negative dielectric anisotropy and has a linear structure (a protrusion or a slit) arranged on each of the pair of substrates in order to control the alignment of the liquid crystal.

It will be noted, hereinafter, the VA mode liquid crystal display according to this method is referred to as an MVA (Multi-domain Vertical Alignment) liquid crystal display in this application.

This MVA liquid crystal display has an advantage that rubbing is not required and, further, the domain dividing is achieved by the arrangement of the linear structure. Therefore, this MVA liquid crystal display can obtain a wide viewing angle and high contrast. Since rubbing is not required, fabrication of the liquid crystal display is simple, the contamination to the alignment film during the rubbing process is eliminated, and reliability of the liquid crystal display is improved.

FIG. 32 is a diagram of a basic structure of the MVA liquid crystal display, showing a single pixel and its periphery. Further, throughout the diagram, items assigned the same reference numeral indicate the same thing and their repeated description is omitted.

An MVA liquid crystal display 130 is an active matrix type liquid crystal display having a thin film transistor (hereinafter, referred to as a TFT) 14 at each pixel as a switching device, and there are a red pixel R, a green pixel G and a blue pixel B in the pixel to perform the color display.

On a TFT substrate where the TFT 14 is provided, a gate bus line 10 partially serving also as a gate electrode of the TFT 14 and a drain bus line 12 are formed. The TFT 14 consists of a drain electrode 12D extending from the drain bus line 12, a source electrode 12S positioned facing the drain electrode 12D, and an overlapping portion between the drain electrode 12D and the source electrode 12S of the gate bus line 10. Further, although not shown, a channel layer made of, for example, amorphous silicon (a-Si) is formed on the gate bus line. Furthermore, a pixel electrode 16 connected to the source electrode 12S is formed on the TFT substrate. In the pixel electrode 16, a slit 18 is provided diagonally to the pixel and this slit 18 becomes a structure to control the alignment of the liquid crystal on the substrate side. A connecting portion 16a is provided at the pixel electrode 16 so that the pixel electrode 16 is not electrically separated by the slit 18. In this way, a pixel electrode 16 in a pixel is electrically connected.

Although not shown, on a color filter substrate (hereinafter, referred to as a CF substrate) where a color filter is formed, a protrusion 20 to control the alignment of the liquid crystal on the CF substrate side is formed and controls the alignment of the liquid crystal together with the slit 18 on the TFT substrate.

For example, when a diagonal distance of an XGA LCD (liquid crystal display) panel is equal to 15 inches, the size of a single pixel is equal to 99 μm×297 μm, the widths of the slit 18 and the protrusion 20 are equal to 10 μm each, the distance between the slit 18 and the protrusion 20 is 25 μm. Further, the width of the connecting portion 16a of the pixel electrode 16 is equal to 4 μm and the distance between an end portion of the drain bus line 12 and an end portion of the pixel electrode 16 is equal to 7 μm.

FIGS. 33a, 33b and 33c are simplified cross sectional views at a line I—I in FIG. 32 and shows actions of the slit 18 and the protrusion 20 which are the structures to control the alignment of the liquid crystal.

FIG. 33a shows a state of the liquid crystal when no voltage is applied between the electrodes on a pair of substrates. The pixel electrode 16 is formed on a glass electrode 24 at the TFT substrate side, and the slit 18 is formed on the pixel electrode 16. Further, an alignment film (vertical alignment film) 32 is formed covering the pixel electrode 16 and the slit 18. On the other hand, a common electrode 26 is formed on a whole surface of a glass substrate 22, facing the pixel electrode 16, and the protrusion 20 made of an insulator (a dielectric) such as photoresist is formed on the common electrode 26. Further, an alignment film (vertical alignment film) 28 is formed covering the common electrode 26 and the protrusion 20.

Furthermore, a liquid crystal layer LC is in between the TFT substrate and the CF substrate, and liquid crystal molecules (indicated by ellipses in the diagram) are aligned perpendicular to the alignment films 32 and 28. Therefore, the liquid crystal molecules are also aligned perpendicular to the alignment film 28 formed on the surface of the protrusion 20, and the liquid crystal molecules adjacent to the surface of the protrusion 20 are in an inclined state against the glass substrate 22. However, when closely observed, the liquid crystal molecules adjacent to the surface of the protrusion 20 are not aligned perpendicular to the alignment film 28, because the liquid crystal molecules are aligned substantially perpendicular to the glass substrate 22 by the alignment film 28 in the area where the protrusion 20 is not formed and due to the continuum characteristics of the liquid crystal, the liquid crystal molecules follow the liquid crystal molecules occupying a portion of the pixel and are in a state inclined from the direction perpendicular to the alignment film 28 to the direction of a normal line of the glass substrate. Also, although not shown, a pair of polarizing plates are arranged on the outside of the glass substrates 22 and 24 in the state of cross-Nicol. Therefore, in a state where no voltage is applied, the display becomes a black display.

FIG. 33b shows equipotential lines when voltage is applied between the electrodes on a pair of substrates and FIG. 33c shows the state of the liquid crystal in the case above. As shown by equipotential lines shown by dotted lines in FIG. 33b, when voltage is applied between the electrodes 16 and 26, distribution of an electric field in the portion where the slit 18 and the protrusion 20 are formed becomes different from the other portion. This is because in the portion where the slit 18 is formed, an oblique electric field is formed from the end portion of the electrode toward the opposing electrode, and in the portion where the protrusion 20 is formed, the electric field is distorted, since the protrusion 20 is a dielectric provided on the electrode 26. Therefore, as shown in FIG. 33c, the liquid crystal molecules lie toward the direction of the arrow in the diagram. In other words, the liquid molecules lie toward the direction perpendicular to the direction of the electric field depending on the magnitude of the voltage, thereby providing a white display in a state when voltage is applied. At this time, when the protrusion 20 is arranged linearly as shown in FIG. 32, the liquid crystal molecules adjacent to the protrusion 20, having the protrusion 20 as the boundary, lie to two substantially perpendicular directions to the direction where the protrusion 20 is arranged. Since the liquid crystal molecules adjacent to the protrusion 20 are slightly inclined toward the perpendicular direction to the substrate even when no voltage is applied, the liquid crystal molecules adjacent to the protrusion 20 quickly respond to the electric field and lie down, followed by surrounding liquid crystal molecules which also lie down quickly and are influenced by the electric field. In a similar manner, when the slit 18 is provided linearly as shown in FIG. 32, the liquid crystal molecules adjacent the slit 18, having the slit 18 as a boundary, also lie to two substantially perpendicular directions to the direction where the slit 18 is arranged.

Thus, in the area between the two alternate long and short dash lines in FIG. 33a, the liquid crystal molecules fall down to the same direction. In other words, the area aligned in the same direction if formed. This area is indicated by [A] in FIG. 32. As shown representatively by [A] through [D] in FIG. 32, since areas aligned to four different directions are formed in a single pixel, in the MVA liquid crystal display 130, characteristics of wide viewing angle can be obtained. It will be noted that alignment control can not only be performed when the slit 18 and the protrusion 20 are combined as shown in FIGS. 32, 33a, 33b and 33c, but also when a protrusion or a slit and a slit, as a structure to control the alignment, are combined.

However, although wide viewing angle can be obtained in the MVA liquid crystal display 130, an area of liquid crystal molecules that are not stable exists, and therefore, the problem of reduction in brightness exists. In other words, when voltage is applied between the electrodes, an alignment defect area 40 shown by hatching in FIG. 32 occurs. Since this alignment defect area 40 is an area where the transmisivity of the light is poor, the alignment defect area results in a reduction in brightness when the white display is performed. When viewed in the plane of FIG. 32, this alignment defect area 40 occurs on the side where the structures (protrusion of slit) provided on the CF substrate form an obtuse angle with an edge portion of the pixel electrode 16. This occurrence of the alignment defect area 40 is caused by a lateral electric field and the like generated by an influence of the drain bus line 12 at the edge portion of the pixel electrode 16. In the area where this alignment defect area 40 occurs, the liquid crystal molecules lie in the different alignment direction from the alignment direction controlled by the structures (the slit 18 and the protrusion 20 in FIG. 32) provided on a pair of substrates. In other words the alignment of the liquid crystal molecules is disturbed in this area due to the occurrence of the lateral electric field and the like, thereby resulting in a deterioration in display characteristic of the MVA liquid crystal display 130.

In order to solve a problem (occurrence of an alignment defect area) characteristic to this MVA liquid crystal display, the applicant of this application proposes a new structure to reduce influences from a lateral electric field and the like.

FIG. 34 shows an MVA liquid crystal display 140 according to the proposal. A distinctive feature of this structure is that an auxiliary protrusion 20c extending from the protrusion 20 provided in the CF substrate side along an end portion of the pixel electrode 16 where the alignment defect area 40 occurs is provided. The auxiliary protrusion 20c can certainly be formed by the same material and the same process as the protrusion 20 or can be formed separately.

FIGS. 35a and 35b are diagrams describing the auxiliary protrusion 20c to be formed on the CF substrate. As a structure of the CF substrate, as shown in FIG. 35a, a method to form a black matrix BM to be formed on the CF substrate by overlaying color resins forming a color filter is proposed. This method is achieved by forming red resin R, green resin G and blue resin B on the glass substrate 22, and overlapping, as blue resin B with green resin G, blue resin B with red resin R, and red resin R with green resin G, at each end portion. The overlapped portion is the black matrix BM. Then, the common electrode 26 and the like are formed above.

In the case of the CF substrate formed by such a method (hereinafter, referred to as a resin overlaying BM method), a level difference equal to approximately 0.2–1.5 µm occurs at portions indicated by circles in FIG. 35*a*, in other words, at the portions color resins are overlapped. If there is the level difference like this, an electric line of force concentrates at the portions, thereby causing alignment defects of liquid crystal molecules.

FIG. 35*b* shows a state when the auxiliary protrusion 20*c* is formed at the portion of the level difference of the black matrix. The auxiliary protrusion 20*c* is formed to cover the portion where there is the level difference. In such a state, the height d1 of the level difference is equal to approximately 0.2–1.5 µm as described above, and the height from the peak portion of the auxiliary protrusion 20*c* is equal to approximately 1.0–2.0 µm. The auxiliary protrusion 20*c* functions to rotatably align the liquid crystal molecules by easing the inclination at the portion where there is the level difference and no to concentrate the electric line of force by forming a material with low dielectric constant at the portion where there is the level difference at an angular portion. For example, a relative dielectric constant $\epsilon$ of the liquid crystal is approximately 6–8 and the relative dielectric constant $\epsilon$ of the protrusion material is approximately 3–4.

However, in the portions designated by the circles in FIG. 35*b*, there is a case when the auxiliary protrusion 20*c* does not sufficiently cover angular portion due to irregularities of level difference, irregularities of locations forming the protrusion, irregularities of the protrusion shape and the like.

FIGS. 36*a*, 36*b*, 37*a*, 37*b* and 37*c* are diagrams showing the problems in the past. In FIG. 36*a*, a case when the auxiliary protrusion 20*c* is provided on the CF substrate of the resin overlaying BM method is shown. FIG. 36*a* shows a cross section at a line I—I in FIG. 34. On the TFT substrate, the drain bus line 12 is formed on the glass substrate 24, the drain bus line 12 is covered with an insulation film 30, and the pixel electrode is further formed on the insulation film 30. The insulation film 30 consists of a TFT gate insulation film, a protection film covering the TFT and the like. Hitherto, the width d1 of the auxiliary protrusion 20*c* is equal to approximately 10 µm, the width d2 where the auxiliary protrusion 20*c* and the pixel electrode 16 overlap is designed to be approximately 4/Lm.

However, if the auxiliary protrusion 20*c* is formed on the CF substrate of the resin overlaying BM method with this design value, the thickness of the protrusion material becomes thin at the angular portion of a color resin, for example, in the angular portion of the green resin G. Since the common electrode 26 is formed on the surface of the green resin G of the angular portion, the electric line of force heading outwards from the display area concentrates, and the liquid crystal molecules become a state of alignment defect due to the electric field in this portion. Since the area of the alignment defect enters inside the display domain, the similar dark portion as the alignment defect area 40 in FIG. 32 is formed.

Further, besides the resin overlaying BM method described above, there is a method using a black resin as the black matrix (hereinafter, referred to as a resin BM method). According to this resin BM method, the black resin is placed in the area forming the black matrix and each resin is formed in an opening portion (display domain) so that the end portion of each resin overlaps the black resin. Therefore, as is the case in the resin overlaying BM method, the level difference is formed and the similar problem described above occurs.

FIG. 36*b* shows a case when other color filter shape is applied on the CF substrate, in which a chrome shading film 34 is formed as the black matrix and the color filter is formed on the shading film 34 by pattering the color resin. In this case, the width d1 of the auxiliary protrusion 20*c* is also equal to approximately 10 µm and the width d2 where the auxiliary protrusion 20*c* and the pixel electrode 16 overlap is also designed to be approximately 4 µm. As shown in FIG. 36*b*, when formed according to the design value, the concentration of electric lines of force heading outwards from the display area is suppressed, the alignment of the liquid crystal molecules is stabilized and the display becomes favorable. However, at the stage when a product is actually fabricated, various irregularities during the fabrication occur, and in many cases desired characteristics are not obtained.

FIGS. 37*a*, 37*b* and 37*c* are diagrams showing problems of misalignment in lamination and shot unevenness as irregularities during the fabrication. FIG. 37*a* shows a case in which a misalignment occurs when the CF substrate and the TFT substrate are laminated, and the width d1 of the auxiliary protrusion 20*c* is equal to approximately 10 µm as is the case in FIG. 36*b*. However, in FIG. 37*a*, the TFT substrate is deviated in an upper right direction to the CF substrate in the diagram, thereby resulting in the width d2 where the auxiliary protrusion 20*c* and the pixel electrode 16 overlap by approximately 3 µm. Therefore, the control power to the liquid crystal molecules is weakened and, an influence from the lateral electric field caused by the drain bus line at the end portion of the pixel electrode 16 occurs, therefore the alignment defect area as indicated by the hatched portion in the diagram occurs. However, in the case of FIG. 37*a*, the alignment defect area is under the auxiliary protrusion 20*c* and does not affect the display. It will be noted that when a misalignment in lamination occurs, the opposing width becomes wider at one end portion of the corresponding pixel electrode and the width becomes narrow at the other end portion. That is, in order to have a sufficient opposing width at the corresponding end portions, a margin for laminating extremely reduces and fabrication also becomes difficult.

At this time, as shown in FIG. 37*c*, exposure and the like are performed by dividing the display domain of a single panel into a plurality of divided areas SA–SD . . . when fabricating the liquid crystal display (liquid crystal panel). Therefore, the same display characteristics can be obtained within each divided area SA–SD . . . . However, when there are deviations or the like during exposure, display characteristics may be different from other divided areas.

FIG. 37*b* shows other divided area in the same panel as FIG. 37*a* and shows a case when shot irregularities occur during exposure. In FIG. 37*b*, since irregularities occur when patterning the pixel electrode 16, although the distance d3 from the end face of the color resin B to the end face of the pixel electrode is supposed to be equal to 7 µm according to the original design value as shown in FIG. 37*a*, the distance d5 in FIG. 37*b* is equal to 7.5 µm. Therefore, the width d4 where the auxiliary protrusion 20*c* and the pixel electrode 16 overlap becomes to be equal to 2.5 µm and the alignment defect area indicated by the hatched portion occurs. Furthermore, the alignment defect area appears in the display domain instead of being hidden by the auxiliary protrusion 20*c*. Therefore, in FIG. 37*b*, the alignment defect area 40 as shown in FIG. 32 occurs in the display domain.

In FIG. 37c, if the divided area SA is an area where the pixel electrode 16 is formed in the position in accordance with the design standard as shown in FIG. 37a and the divided area SB is an area where the position of the pixel electrode 16 is deviated from the predetermined position due to shot irregularities as shown in FIG. 37b, although a desired bright display is performed in the divided area SA when a certain display is performed, the alignment defect area occurs in the divided area SB, thereby resulting in a dark display. In other words, an irregular shot phenomenon occurs.

FIG. 38 is a diagram showing the relationship between the design value of the overlapping width (opposing width) and the generation ratio of shot irregularities in which the overlapping width between the auxiliary protrusion and the pixel electrode. Here, an attention should be paid that the design value of the overlapping width on the lateral axis is not the overlapping width inside the actual panel. Even if the panel is fabricated according to a certain design value, irregularities of several µm due to a misalignment of lamination between an upper and lower substrates, inaccuracy of the pattern for the structure (protrusion, color resin for color filter, etc.) formed on the substrate or the influence from the divided areas described above occur inside the actually fabricated panel. Therefore, the value of the overlapping width, when the whole display domain is viewed, is in a certain range. In this case, the alignment defect area appears inside the display domain in the portion where the overlapping width is small and the difference in brightness partially occurs in the whole display domain. In such a case, shot irregularities are considered to have occurred at the design value.

When observing this, if the design value of the overlapping width, in other words, if the design center is equal to approximately 4 µm, the irregularity in shooting occurs at a ratio of substantially 50%. The range of the values for the actual overlapping widths in this case is considered to vary from approximately 1 µm to 7 µm. If the design center is equal to approximately 6 µm, the shot irregularities are almost eliminated. The overlapping width in this case is considered to vary from approximately 3 µm to 9 µm.

Thus, in the MVA liquid crystal display in the past, as is the case using the color filter of the resin overlaying BM method or the resin BM method, a problem that many display defects in which brightness reduces occurs when there is a large level difference on the substrate. Further, there is a problem that poor yield caused by extremely small margin in fabrication exists as is the case because a display defect is easily caused by slight irregularities in fabrication.

Therefore, an object of the present invention is to provide a liquid crystal display which is high in brightness and has preferable display characteristics and its fabrication method.

Another object of the present invention is to provide a liquid crystal display with large margin in fabrication, high yield, and preferable display characteristics and its fabrication method.

SUMMARY OF THE INVENTION

According to the first aspect of the present invention, the above subjects can be solved by a liquid crystal display having the following distinctive feature:

That is to say, a liquid crystal display comprises a first substrate having a first electrode, a second substrate having a second electrode corresponding to a pixel, liquid crystal having negative dielectric anisotropy sealed between the first and the second substrates, a structure which is provided on at least the first substrate to control an alignment of the liquid crystal, and wherein the structure on the first substrate has a linear protrusion structure, an auxiliary protrusion structure extending from the protrusion structure and opposing to each of facing end portions of the second electrode, and a width of the auxiliary protrusion structure wider than a width of the protrusion structure.

According to the first aspect of the present invention, since the width of the auxiliary protrusion facing the second electrode is more than 6 µm at each corresponding end portion of the second electrode, an alignment defect area does not appear inside the display domain and a bright and preferable display with no reduction in brightness is possible.

DESCRIPTION OF THE PREFERRED EMBODIMENTS

Embodiments of the present invention are described below with reference to diagrams.

Figure 1:
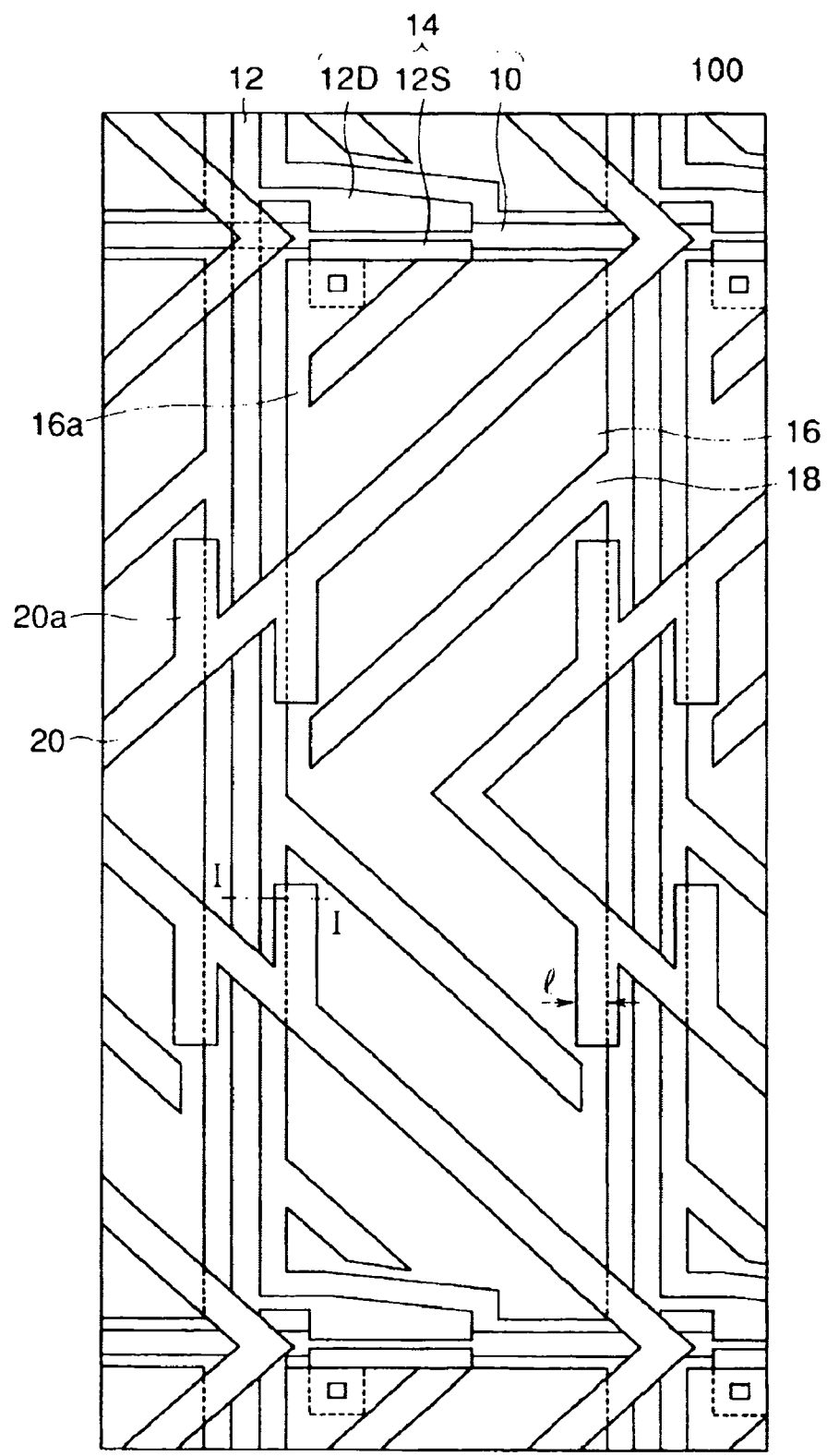
FIG. 1 is a diagram showing a first embodiment of the present invention.

FIG. 1 shows a first embodiment of the present invention and is according to the first aspect of the present invention.

With reference to FIG. 1, a MVA liquid crystal display 100 is an active matrix type liquid crystal display provided with a switching device and a thin film transistor (hereinafter, referred to as a TFT) 14 at each pixel and there are a red pixel R, a green pixel G and a blue pixel B as the pixels so that color display can be performed. FIG. 1 shows one of the pixels and its peripheral portion.

On a TFT substrate where a TFT 14 is provided, wirings of a gate bus line 10 partially serving as a gate electrode for the TFT 14 and a drain bus line 12 are formed. The TFT 14 consists of a drain electrode 12D extending from a drain bus line 12, a source electrode 12S placed opposing to the drain electrode 12D, the drain electrode 12D of the gate bus line 10 and a part overlapping the source electrode 12S. Further, although not shown, a channel layer made of, for example, a-Si film is formed on the gate bus line. Furthermore, a pixel electrode 16 connected to the source electrode 12S is formed on the TFT substrate. In the pixel electrode 16, a slit 18 is provided diagonally to the pixel in the diagram and this slit 18 becomes a structure which controls the alignment of the liquid crystal on the substrate side. A connecting portion 16a is provided at the pixel electrode 16 so that the pixel electrode 16 is not electrically separated by the slit 18. In this manner, a pixel electrode in a single pixel is electrically connected.

On a CF substrate where a color filter not shown is formed, a protrusion 20 which is to be a structure to control the alignment of the liquid crystal on the CF substrate side is provided diagonally to the pixel, and controls the alignment of the liquid crystal along with the slit 18 on the TFT substrate. The slit 18 and the protrusion 20 are placed alternately when viewed in the plane. Further, an auxiliary protrusion 20a is formed to extend out of the protrusion 20 along the end portion of the pixel electrode 16. The auxiliary protrusion 20a is formed by extending out of the protrusion 20 at a side, where the protrusion 20 and a pixel electrode 20a form an obtuse angle, at the part where the protrusion 20 intersects the pixel electrode 16 when viewed in the plane.

For example, when the MVA liquid crystal display 100 is an XGA LCD panel which has a diagonal distance of 15 inches, the size of a single pixel is equal to 99 $\mu m \times 297$ $\mu m$, the widths of the slit 18 and the protrusion 20 are equal to 10 $\mu m$ respectively, and the distance between the slit 18 the protrusion 20 when viewed in the plane is equal to 25 $\mu m$. Further, the width of the connecting portion 16a of the pixel electrode 16 is equal to 4 $\mu m$ and the distance between the end portion of the drain bus line 12 and the end portion of the pixel electrode 16 is equal to 7 $\mu m$.

The point which makes the MVA liquid crystal display 100 shown in FIG. 1 different from an MVA liquid crystal display 140 is the arrangement of the auxiliary protrusion 20a. The auxiliary protrusion 20a of the MVA liquid crystal display 100 is formed by entering inside a display domain in comparison with an auxiliary protrusion 20c of the MVA liquid crystal display 140. Here, the display domain means an opening of the pixel and the area where a light actually transmits. Although not shown in FIG. 1, a black matrix is formed on the CF substrate having the protrusion 20 and the end face of the black matrix and the end face of the pixel electrode 16 are formed so that they substantially coincide with each other, and in FIG. 1, an borderline of the pixel electrode 16 (The borderline is a borderline on an assumption that the slit 18 does not exist. The same thing applies below.) becomes a visible outline of the display domain. In FIG. 1, all the auxiliary protrusions 20a are formed so that the width between the auxiliary protrusion 20a and the opposing pixel electrode 16 becomes equal to approximately 8 $\mu m$.

Figure 2A:
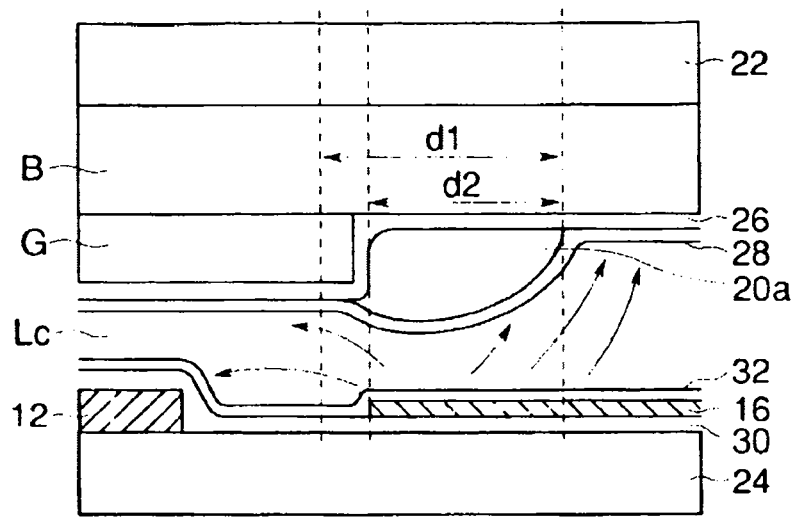
FIGS. 2a and 2b are diagrams showing an action of the present invention.

FIG. 2a is a cross sectional view at a line I—I in FIG. 1 and shows an action according to the structure in FIG. 1. A resin overlaid BM type color filter is formed on the CF substrate, a blue resin B is formed on the glass substrate 22, and at the portion where the black matrix is formed, a green resin G is formed by overlaying on the blue resin B. Further, the end face of the green resin G, which is to be the end face of the black matrix, substantially coincide with the end face of the pixel electrode 16 formed on a glass substrate 24. Thus, a portion where the pixel electrode 16 is formed (including a slit 18 portion) is the display domain.

The width d1 of the auxiliary protrusion 20a is equal to approximately 10 $\mu m$ and the opposing width d2 between the auxiliary protrusion 20a and the pixel electrode 16 is equal to 8 $\mu m$. Further, since the auxiliary protrusion 20a is formed sufficiently inside (display domain side) in order to avoid an influence from an angular portion of the green pixel G, concentration of an electric line of force toward an angular portion of color resin can be avoided and an alignment defect area does not appear in the display domain. Therefore, a light and good display with a high brightness can be obtained. Furthermore, in the aforementioned example, the width d1 of the auxiliary protrusion 20c is the same as the width of the protrusion 20 which is equal to 10 μm. However, the width of the auxiliary protrusion 20c is not limited to this and may certainly be, for example, approximately 12 μm which is longer than the width of the protrusion 20.

Figure 3:
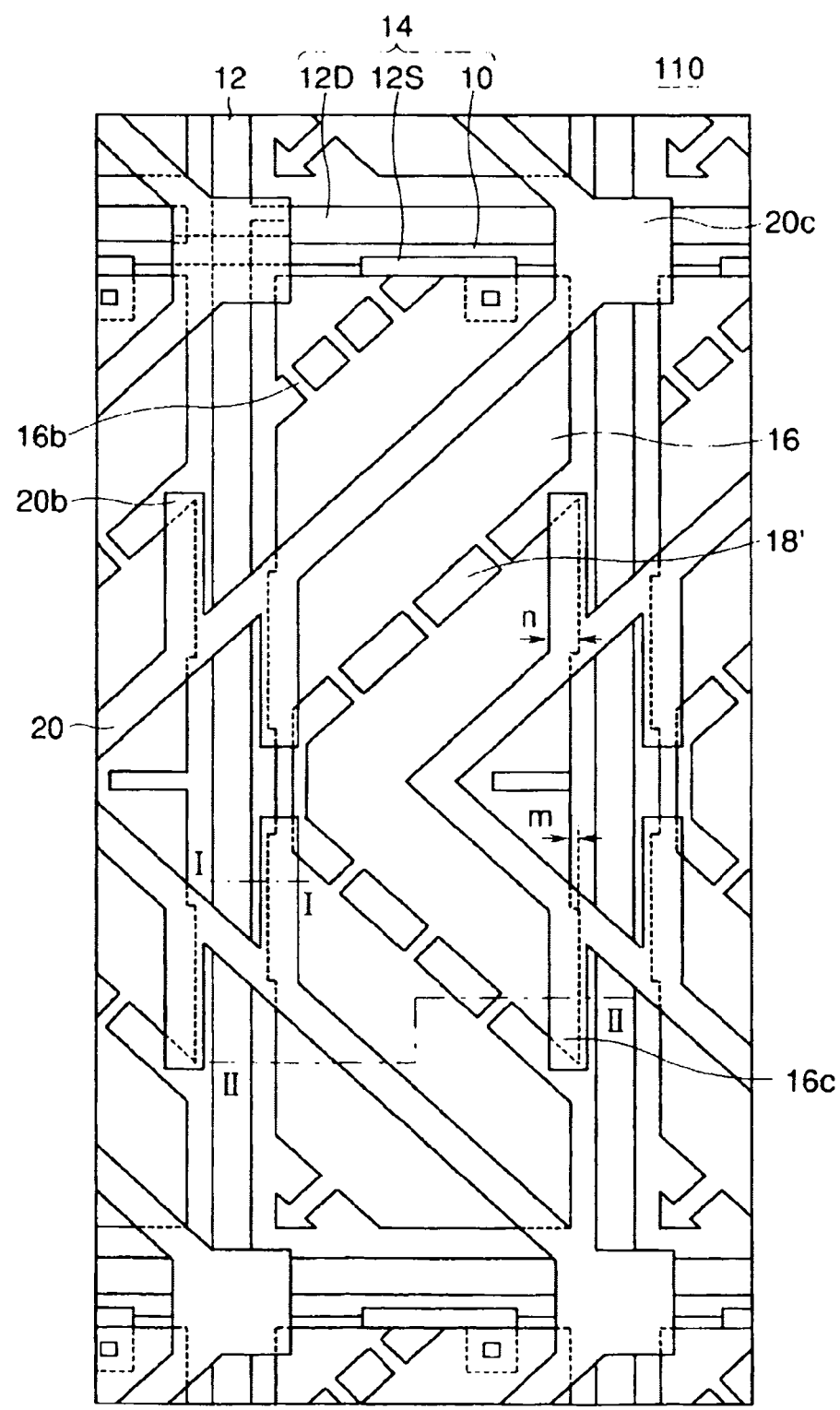
FIG. 3 is a diagram showing a second embodiment of the present invention.

FIG. 3 shows a second embodiment of the present invention and is according to the second aspect of the present invention.

With reference to FIG. 3, the points which make an MVA liquid crystal display 110 different from the MVA liquid crystal display 100 in FIG. 1 are the position of an auxiliary protrusion 20b and the shape of the pixel electrode 16 at the opposing portion to the auxiliary protrusion 20b.

In the MVA liquid crystal display 110, the auxiliary protrusion 20b is formed at the borderline of the pixel electrode 16, in other words, 6 μm inside the visible outline of the display domain. Further, an overhanging portion 16c extending beyond the borderline of the pixel electrode 16 is formed at a portion where the pixel electrode 16 faces the auxiliary protrusion 20b. The overhanging amount of the overhanging portion 16c becomes equal to 2 μm. Therefore, an opposing width between the auxiliary protrusion 20b and the pixel electrode 16 becomes equal to 8 μm which provides a sufficient opposing width. Compared with the first embodiment, although the opposing widths are the same and equal to 8 μm, the auxiliary protrusion 20b does not enter the display domain, thereby reducing an occupied area of the auxiliary protrusion 20b at the display domain and increasing an aperture ratio more. This contributes to an increase in brightness.

Further, a slit is composed of a collection of short slits 18' in the MVA liquid crystal display 110. A connecting portion 16b of the pixel electrode 16 is formed between the slits 18'. A structure to control the alignment is thus formed by a plurality of unit structures to stabilize the alignment of liquid crystal molecules on the structure, and to create a higher brightness and a quick response time can be improved.

Figure 2B:
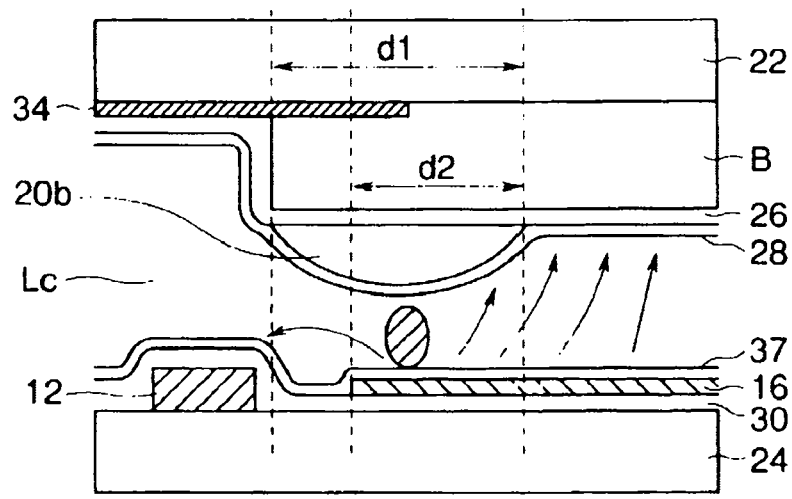

FIG. 2b is a cross sectional view at a line I—I in FIG. 3 and shows an action according to the structure in FIG. 3. A color filter using a chrome shading film as the black matrix is formed on the CF substrate. The width d1 of the auxiliary protrusion 20b and the opposing width d2 between the auxiliary protrusion 20b and the pixel electrode 16 are equal to 10 μm and 8 μm respectively as is the case of the first embodiment. However, since the pixel electrode 16 has the overhanging portion 16c extending beyond the display domain, the width of the auxiliary protrusion 20b entering the display domain is reduced.

Figure 4:
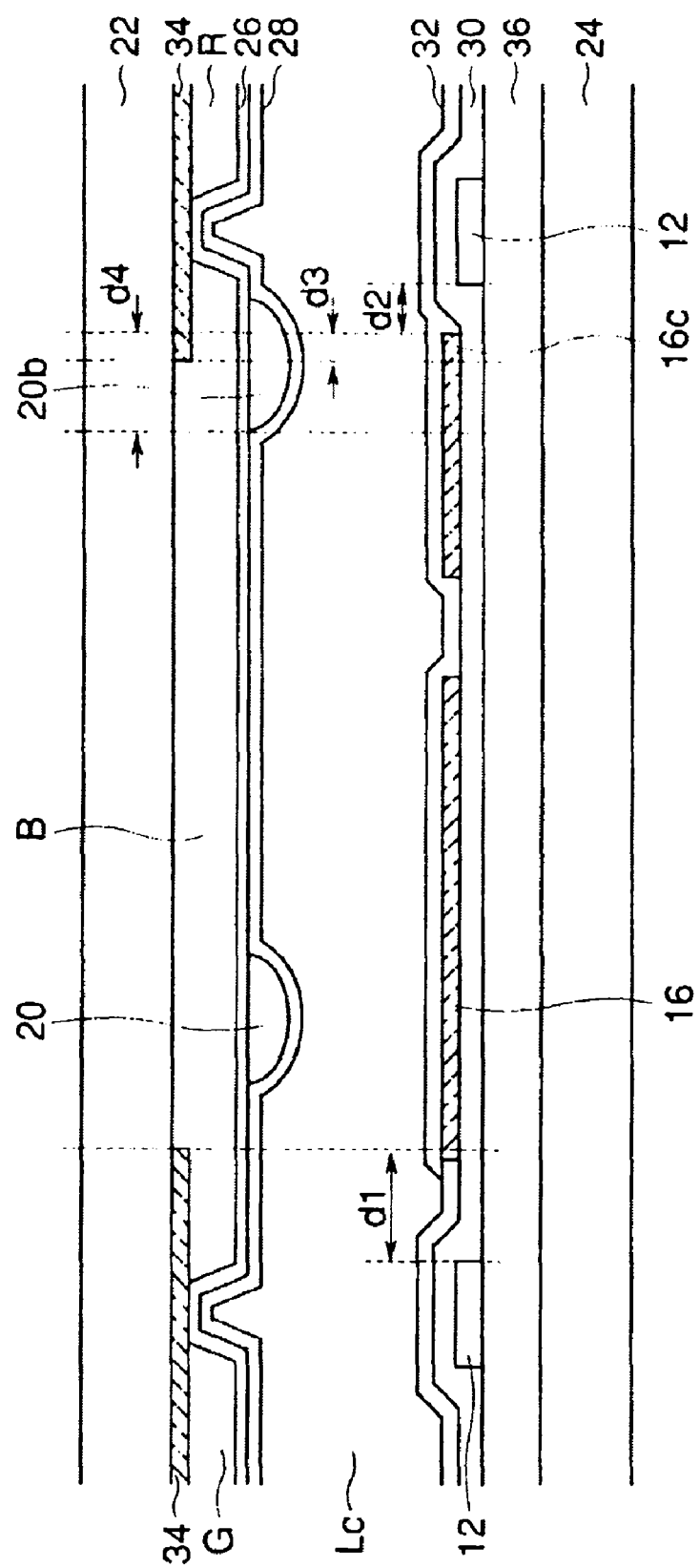
FIG. 4 is a diagram showing a cross section at a line II—II in FIG. 3.

With reference to FIG. 4 which is a cross sectional view at a line II—II in FIG. 3, a detailed description follows. Although not shown, a gate electrode made of aluminum and the like is formed on the glass substrate 24 on the TFT substrate side, and a gate insulation film 36 is formed approximately to 400 nm in thickness on the gate electrode. A drain bus line 12 is formed approximately to 150–350 nm in thickness on the gate insulation film 36 and a protection film 30 covering the TFT is formed approximately to 330 nm in thickness on the drain bus line 12. An ITO (indium tin oxide) which is to be the pixel electrode 16 is formed approximately to 50–150 nm in thickness on the protection film 30 and an alignment film 32 covering the protection film 30 and the pixel electrode 16 is formed approximately to 30–120 nm in thickness.

Further, a chrome shading film 34 is formed to approximately 100–200 nm in thickness on the glass substrate 22 on the CF substrate side and color resins R, G and B are formed to approximately 0.9–2.5 μm each in thickness. The ITO which is to be a common electrode 26 is formed to approximately 50–150 nm in thickness on the color resins R, G and B, and an alignment film 28 is formed to approximately 30–120 nm in thickness on the ITO. It will be noted that the protrusion 20 and the auxiliary protrusion 20b are formed on the common electrode 26, covered by the alignment film 28, and have the height of approximately 1.2–1.8 μm.

An end face of the pixel electrode 16 excluding the overhanging portion 16c of the pixel electrode 16 substantially coincides with an end face of the chrome shading film 34 and the distance d1 between the drain bus line 12 and the pixel electrode 16 is equal to 7 μm. Further, the overhanging portion 16c of the pixel electrode 16 extends 2 μm out of the display domain. Therefore, the distance d2 between the drain bus line 12 and the overhanging portion 16c is equal to 5 μm and the overlapping width d3 with the chrome shading film 34 is 2 μm. Furthermore, the width of the auxiliary protrusion 20b overhanging on the display domain is equal to 6 μm and as a consequence, an opposing width between the auxiliary protrusion 20b and the pixel electrode 16 is 8 μm. So, the width of the auxiliary protrusion 20b entering the display domain is reduced as well as light and good display with a high brightness can be obtained, thereby improving the aperture ratio.

It will be noted that if the width of the overhanging portion 16c is made larger, the auxiliary protrusion 20b on the CF substrate side is not required to be formed. That is because since an alignment defect area occurs slightly inside the end portion of the pixel electrode 16, when the extending width becomes larger, even if the alignment defect area occurs, the alignment defect area appearing in the display domain can be suppressed.

Figure 5A:
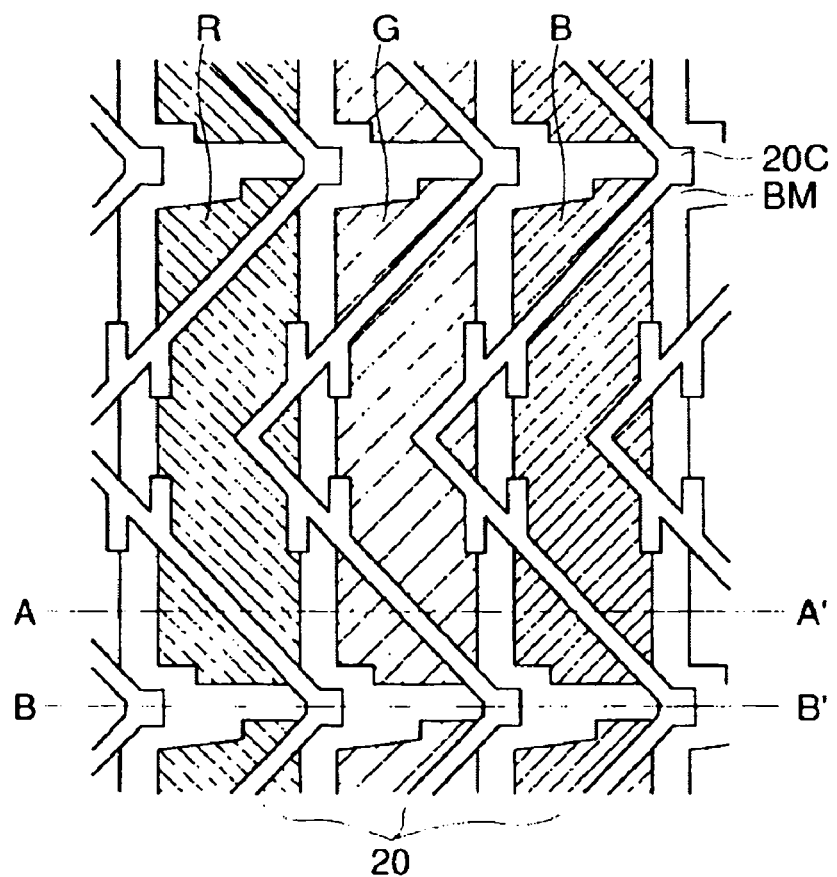
FIGS. 5a, 5b and 5c are diagrams showing a structure of a spacerless CF.
Figure 5B:
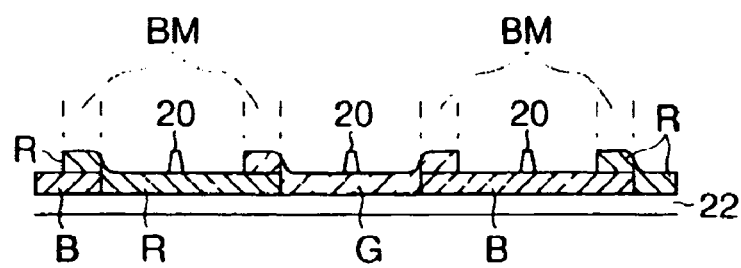
Figure 5C:
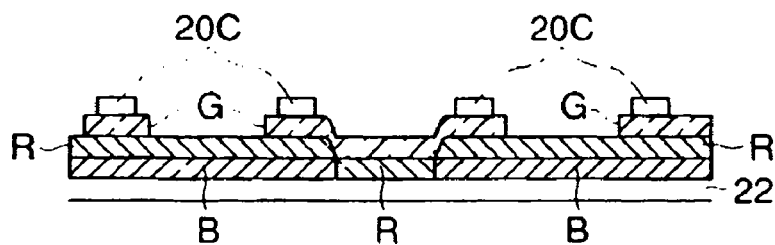

FIGS. 5a, 5b and 5c show an example of a structure of the CF substrate and shows a technology in which a protrusion structure is overlaid on a resin overlaying BM method to serve also as a spacer (hereinafter, referred to as a spacerless CF). A CF substrate using this spacerless CF can be applied to the first and second embodiments and a third embodiment to be described below. In FIG. 5a, hatching portions are portions each of color resin R, G and B is formed and functions as a color filter. Other portions are overlaid by color resins and function as the black matrix. The protrusion 20 is formed thereon. FIG. 5b is a cross sectional view at a line A–A' in FIG. 5a. As shown in FIG. 5b, two color resins are overlaid between each linear pixel to form the black matrix BM. Further, FIG. 5c is a cross sectional view at a line B–B' in FIG. 5a. While portions other than lattice points become the black matrix BM by overlaying two color resins, three color resins are overlaid at the lattice points and furthermore, a protrusion 20c which is a part of the protrusion 20 is overlaid thereon and the protrusion 20c functions as the spacer.

Figure 6:
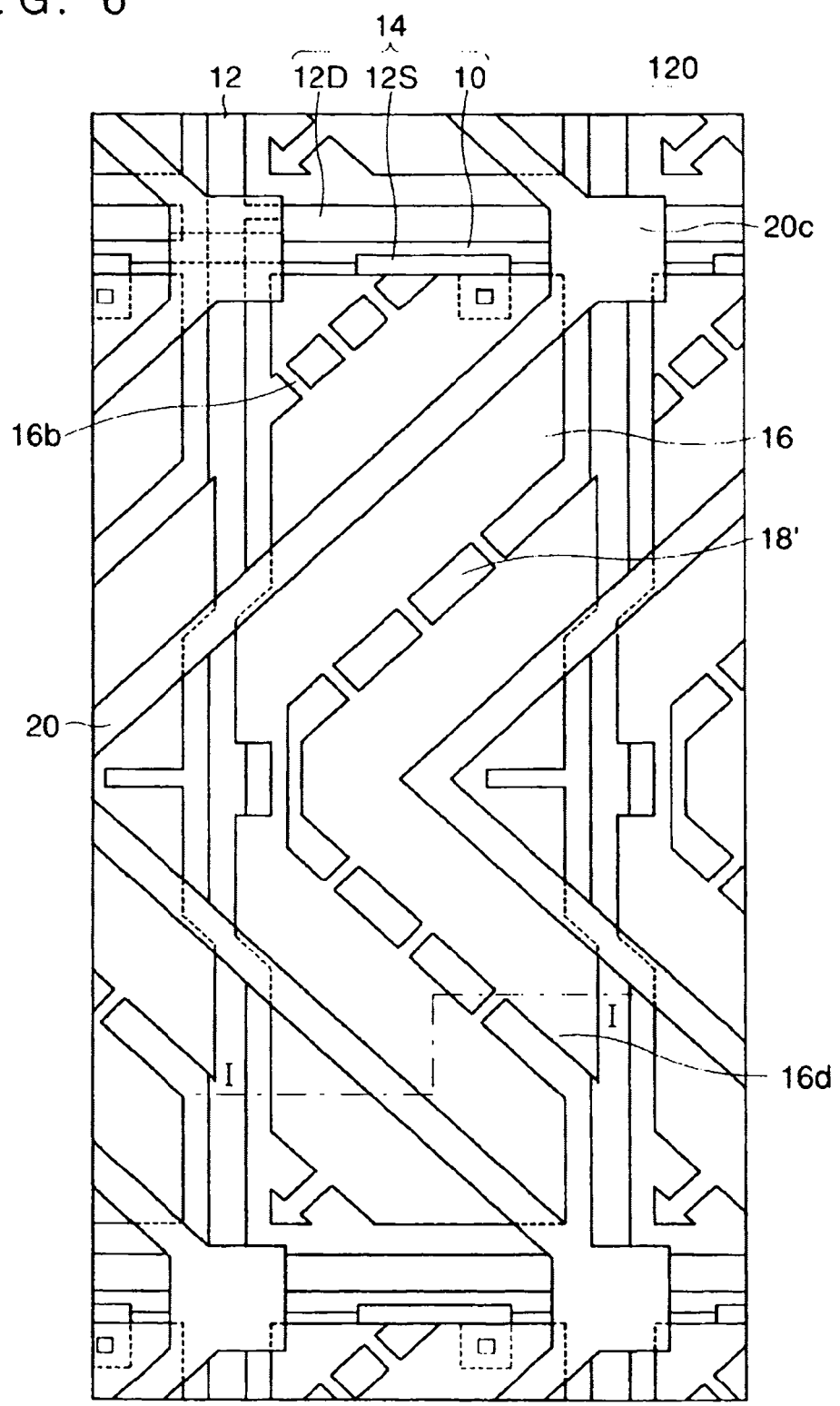
FIG. 6 is a diagram showing a third embodiment of the present invention.

FIG. 6 is a third embodiment of the present invention and is according to the third aspect of the present invention.

With reference to FIG. 6, the points which make an MVA liquid crystal display 120 different from the MVA liquid crystal display 110 in FIG. 3 are that an auxiliary protrusion is not formed and a shape of the pixel electrode 16 at a portion where an auxiliary protrusion is formed in the other embodiments.

Figure 32:
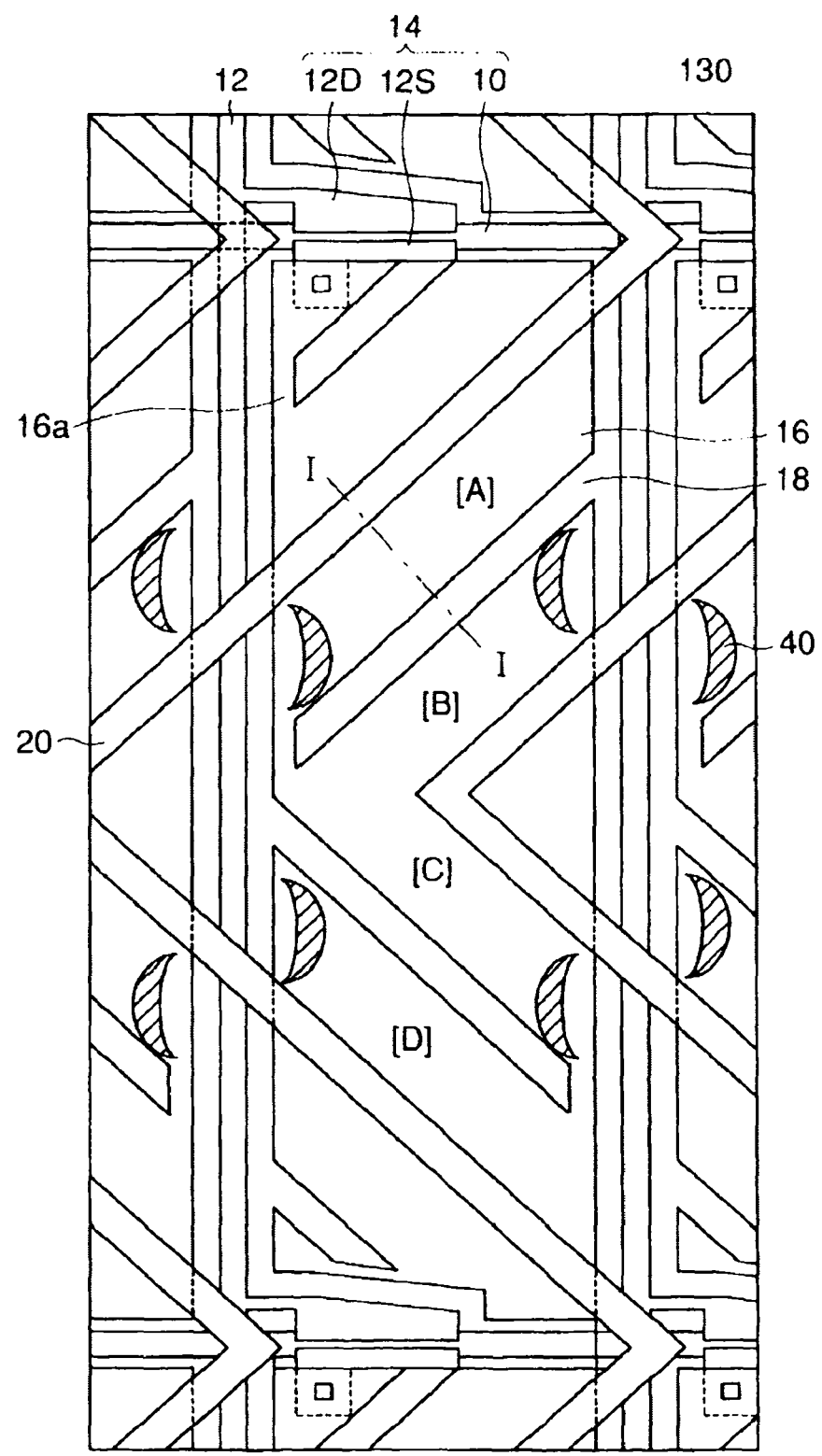
FIG. 32 is a diagram showing a basic structure of an MVA liquid crystal display.
Figure 33A:
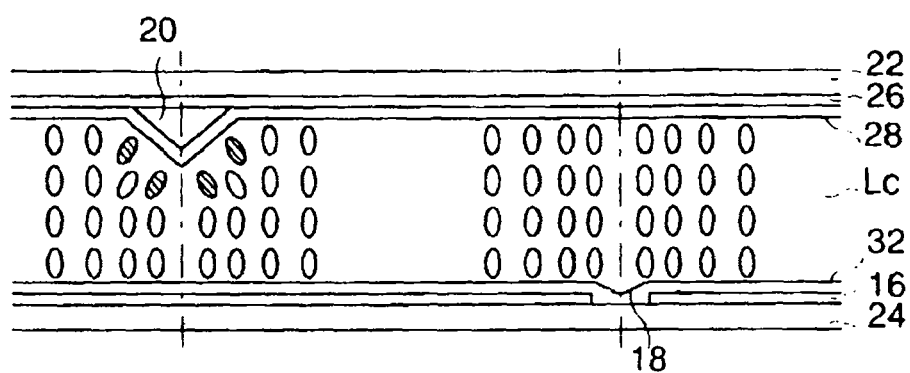
FIGS. 33a through 33c are diagrams showing a theory of the MVA liquid crystal display.
Figure 33B:
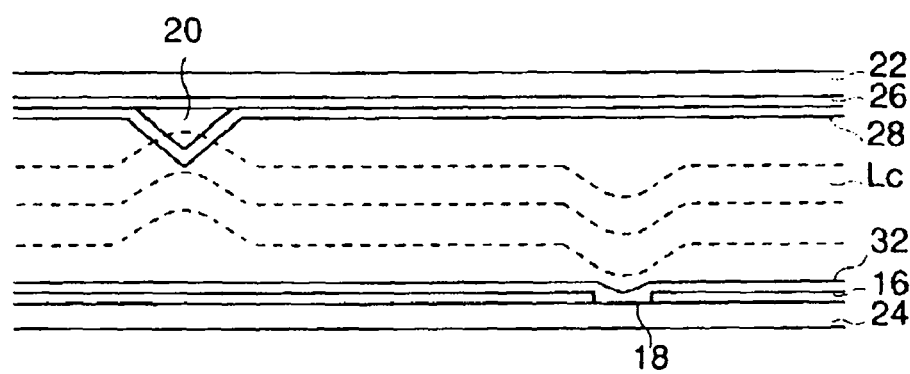
Figure 33C:
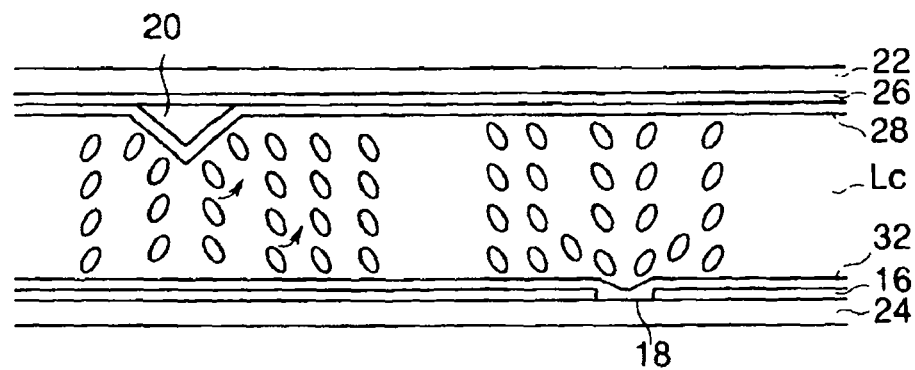
Figure 34:
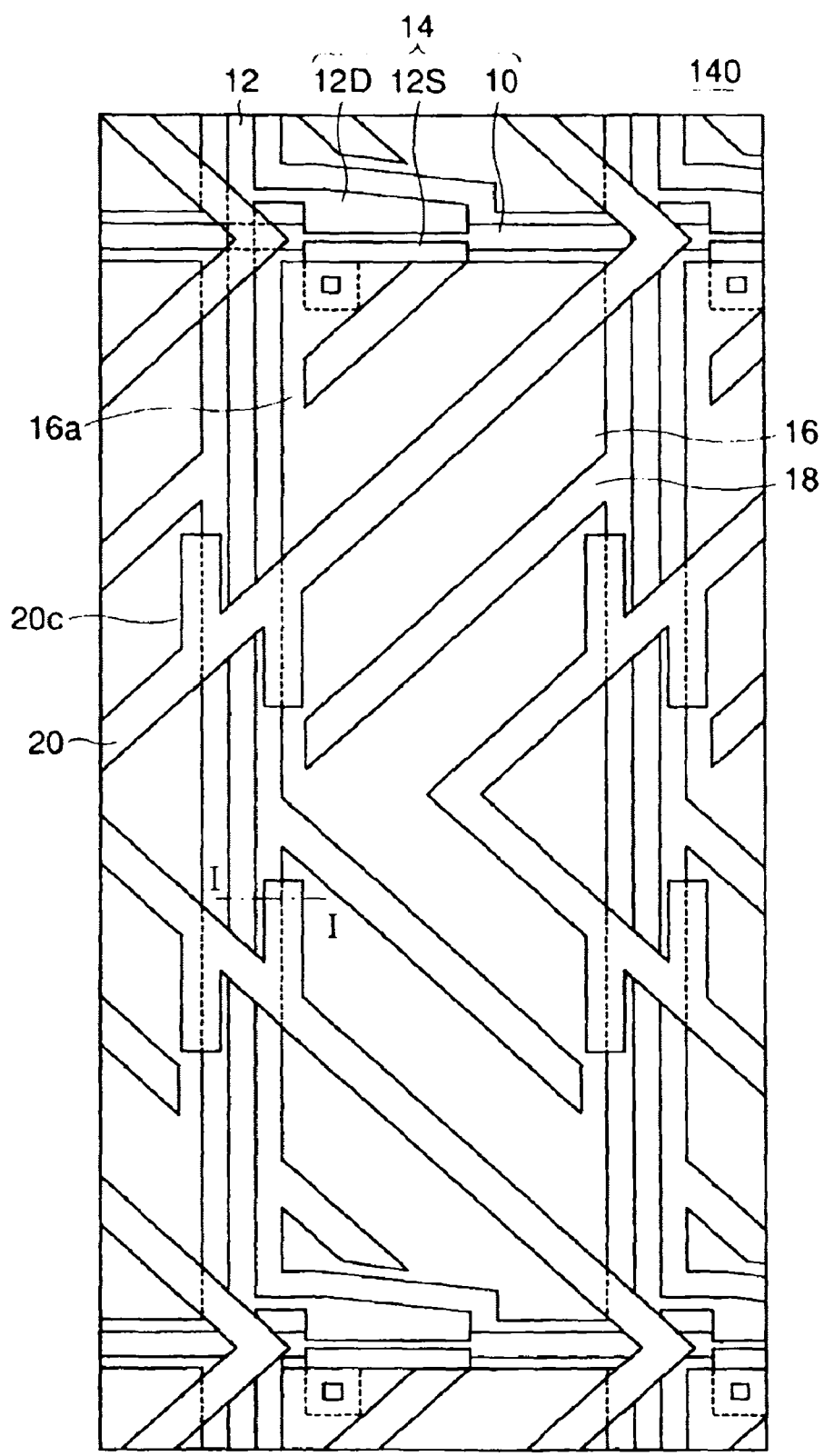
FIG. 34 is a diagram showing the MVA liquid crystal display provided with an auxiliary protrusion in the past.
Figure 35A:
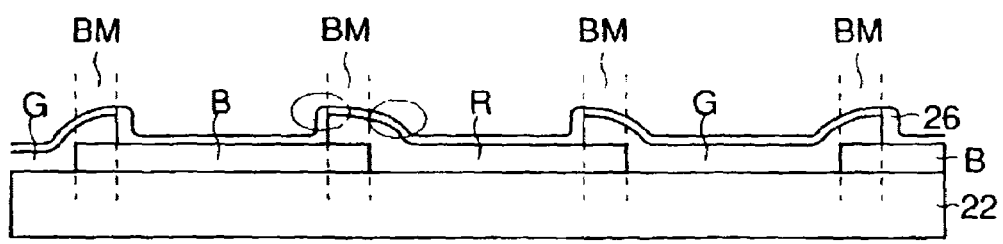
FIGS. 35a and 35b are diagrams showing an action of the auxiliary protrusion.
Figure 35B:
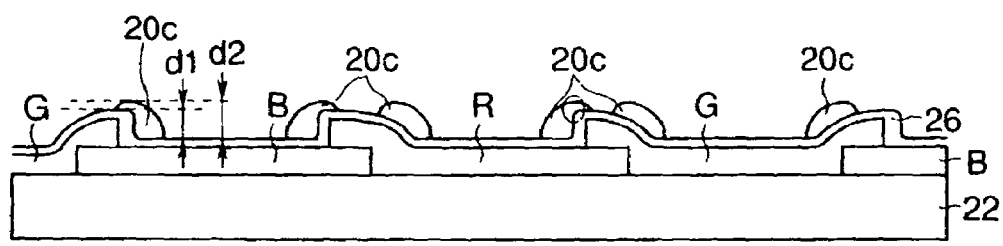
Figure 36A:
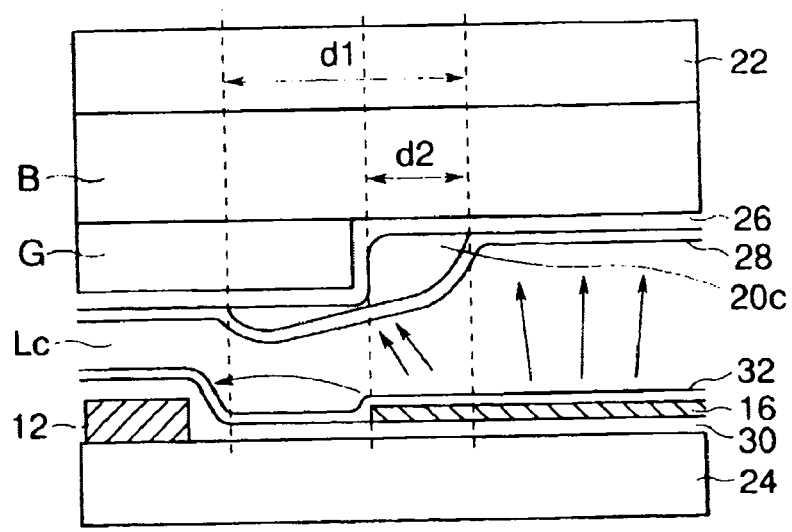
FIGS. 36a and 36b are diagrams showing a problem point in the past.
Figure 36B:
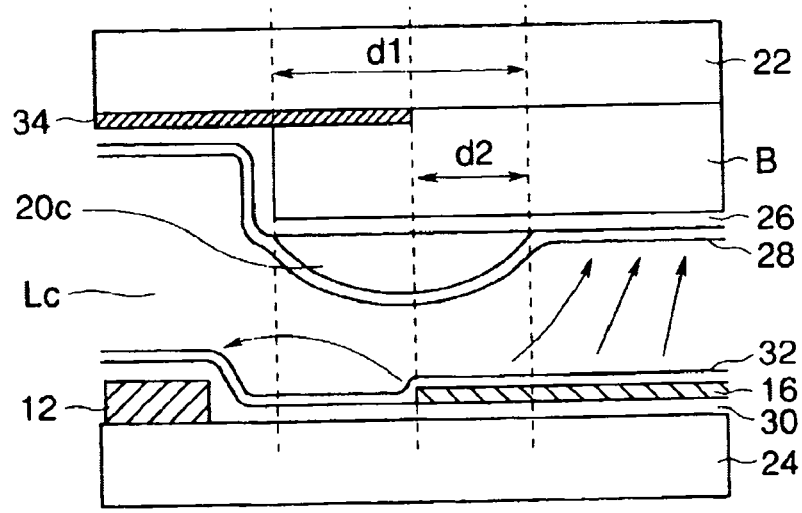
Figure 37A:
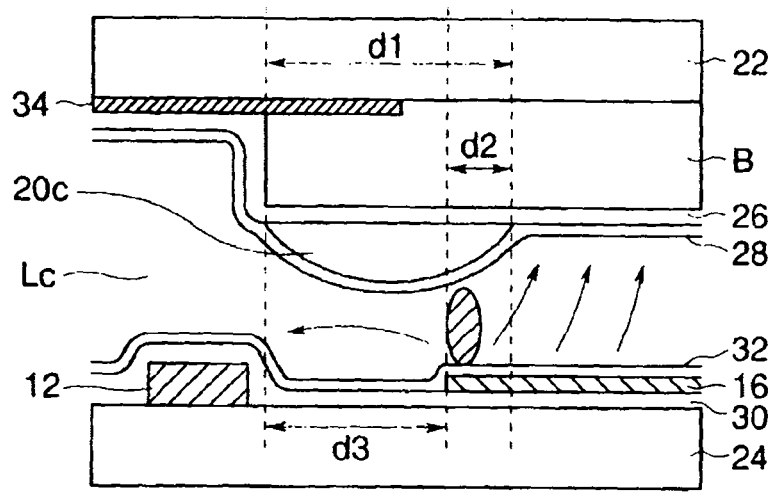
FIGS. 37a, 37b and 37c are diagrams showing a problem point in the past.
Figure 37B:
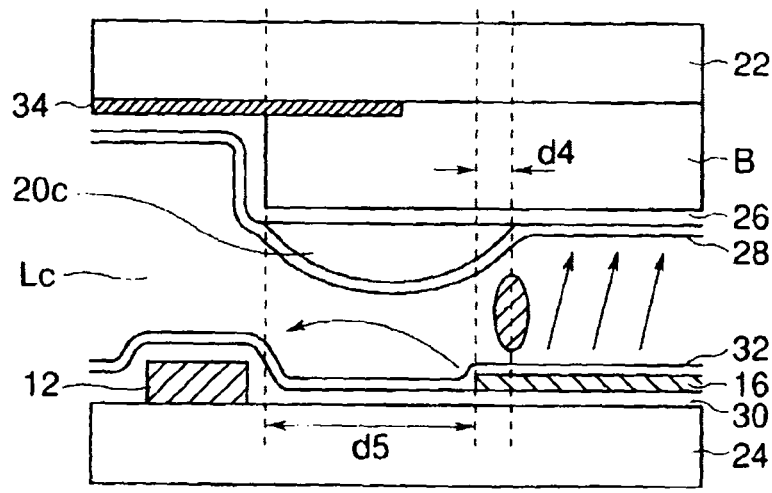
Figure 37C:
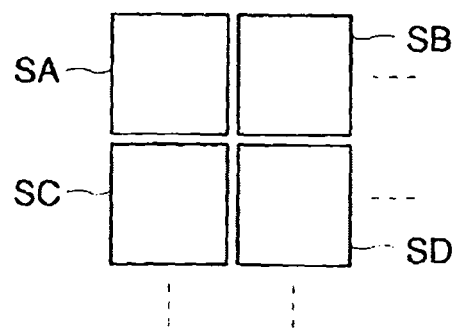
Figure 38:
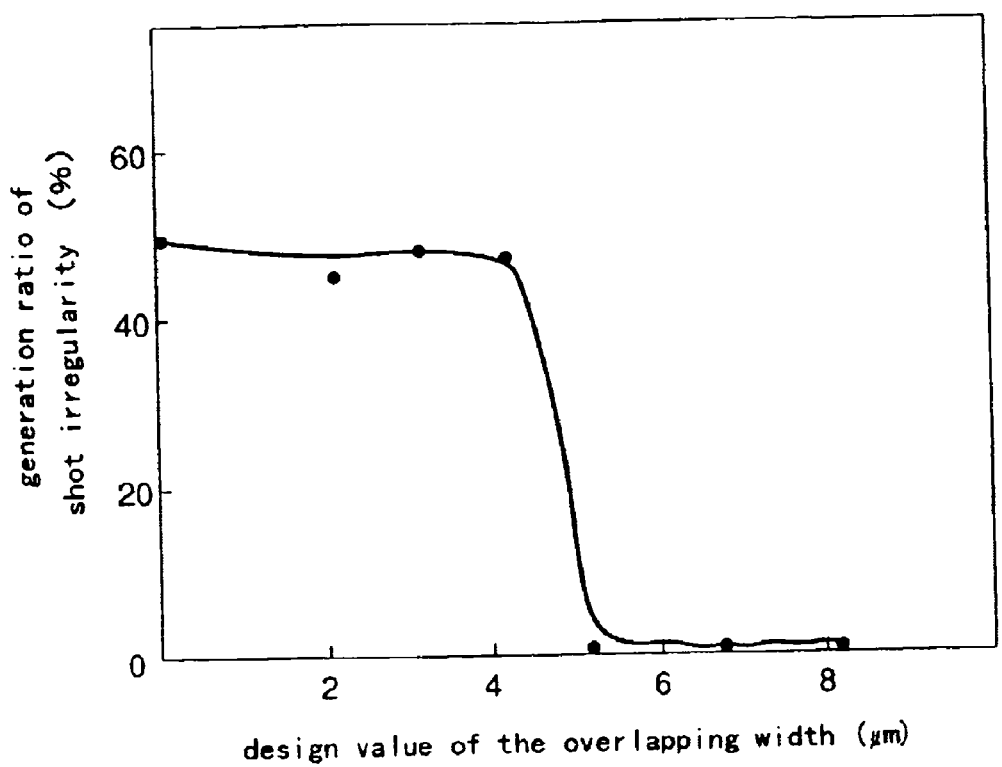
FIG. 38 is a graph showing an occurrence rate of shot irregularities.

In the MVA liquid crystal display 120, the auxiliary protrusion is not formed. Instead, an overhanging portion 16d extending beyond the display domain and extending to above the drain bus line 12 which is the wiring is formed at the pixel electrode 16. The overhanging portion 16d is formed by extending an end portion where the pixel electrode 16 and the protrusion 20 form an obtuse angle, beyond the display domain, in an area decided by the slit 18 arranged substantially in parallel and end portions of the protrusion 20 and the pixel electrode 16. In other words, the overhanging portion 16d is a pixel electrode portion adjacent to an area where the alignment defect area 40 occurs in the MVA liquid crystal display 130 in FIG. 32.

Figure 7:
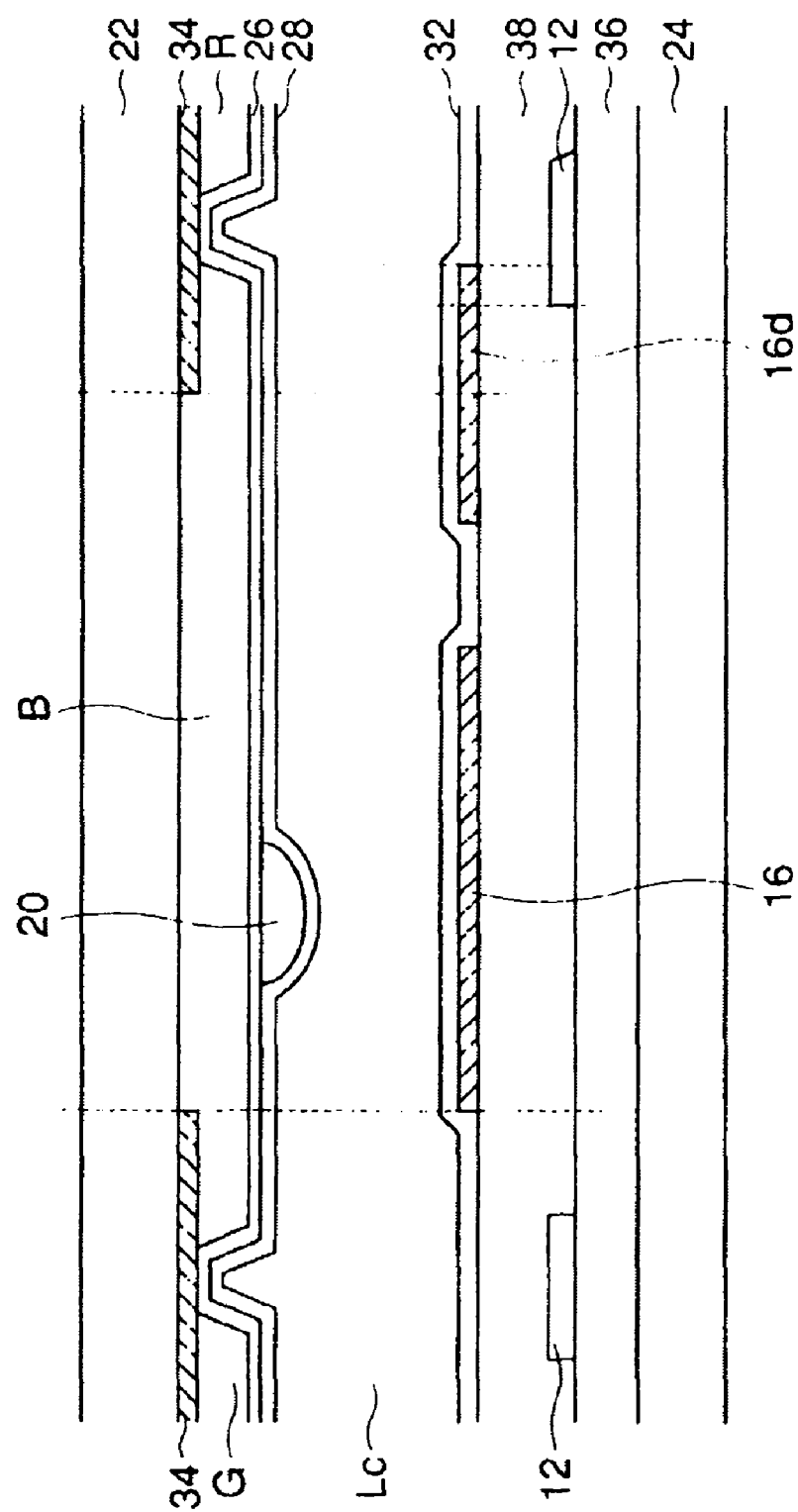
FIG. 7 is a diagram showing a cross section at a line I—I in FIG. 6.

With reference to FIG. 7 which is a cross sectional view at a line I—I in FIG. 6, a detailed description follows. First, in this embodiment, an auxiliary protrusion is not formed on the CF substrate side. On the TFT substrate side, a gate insulation film 36 is formed on the glass substrate 24 and the drain bus line 12 to be wiring is formed there. Further, a planarized film 38 which is made of acrylic resin and the like and serves also as a protecting film for the TFT is formed. The pixel electrode 16 and the alignment film 32 are formed on the planarized film 38. An end face of the pixel electrode 16 other than the overhanging portion 16d of the pixel electrode 16 substantially coincides with an end face of the chrome shading film 34. Furthermore, the overhanging portion 16d of the pixel electrode 16 extends 9 μm beyond the display domain (in other words, overlapping of 9 μm with the chrome shading film 34 exists), and overlapping of 2 μm with the drain bus line 12 via the planarized film 38 exists. By structuring in this manner, the end portion of the pixel electrode 16 can be arranged at a position sufficiently apart from the display domain. Also, since the thick planarized film 38 is between the overhanging portion 16d and the drain bus line 12, an influence from the drain bus line 12 can be reduced. Thus, even if the alignment defect area occurs in adjacent to the end portion of the overhanging portion 16d, the alignment defect area occurs sufficiently apart from the display domain and does not affect the display. Hence, the light and good display with a high brightness can be obtained and since an arrangement of the auxiliary protrusion is not required, the aperture ratio can also be improved.

It will be noted that, in this embodiment, the auxiliary protrusion may be formed on the CF substrate side. In that case, consideration may be given to a position to form the auxiliary protrusion so that an influence given to the aperture ratio is reduced.

Although the present invention is described above in detail, the present invention is not limited to the above embodiments and can be deformed to an extent the present invention is not deviated.

It will be noted that, in the present invention, the following structure may also be distinctive features:

(1) A first substrate is the CF substrate and a first electrode is the common electrode.

(2) A second substrate is the TFT substrate and a second electrode is the pixel electrode.

(3) In the above structure (2), a structure of the second substrate is the slit to be formed in the pixel electrode.

(4) A structure to control the alignment of the liquid crystal on the first and the second substrate is arranged in an inclined fashion against the pixel.

(5) In the above structure (4), inclined directions against the pixel are at least two directions in a single pixel.

(6) The width of the auxiliary protrusion is equal to approximately 10 μm and the opposing width is equal to approximately 8 μm.

(7) The width the second electrode extends is more than 2 μm.

(8) In the above structure (1), a shape is formed by a level difference formed by overlaying resins and the auxiliary protrusion is formed at the portion of the level difference exists.

(9) In the above structure (8), the black matrix is formed by overlaying color resins provided at each pixel.

(10) In the above structure (8), a black resin to be the black matrix is provided and the end portion of color resins provided at each pixel is overlapped with the black resin.

(11) In the above structure (8), the distance between an end face of the portion where the level difference exists and the end portion of the auxiliary protrusion is more than 6 μm.

Next, the liquid crystal display according to the fourth embodiment of the present invention is described with reference to FIG. 8a through FIG. 15c. This embodiment is according to the third aspect of the present invention and has a distinctive feature in which the structure of the CF substrate described with reference to FIGS. 5a, 5b and 5c in the second embodiment is further improved.

The CF substrate shown in FIGS. 5a, 5b and 5c forms the color resins R, G and B at each pixel and forms the black matrix BM by overlaying two or three layers of color resins R, G and B in the shaded areas between the pixels. And after forming the common electrode 26 by depositing the ITO, the protrusion 20 to control an alignment direction is formed.

Figure 8A:
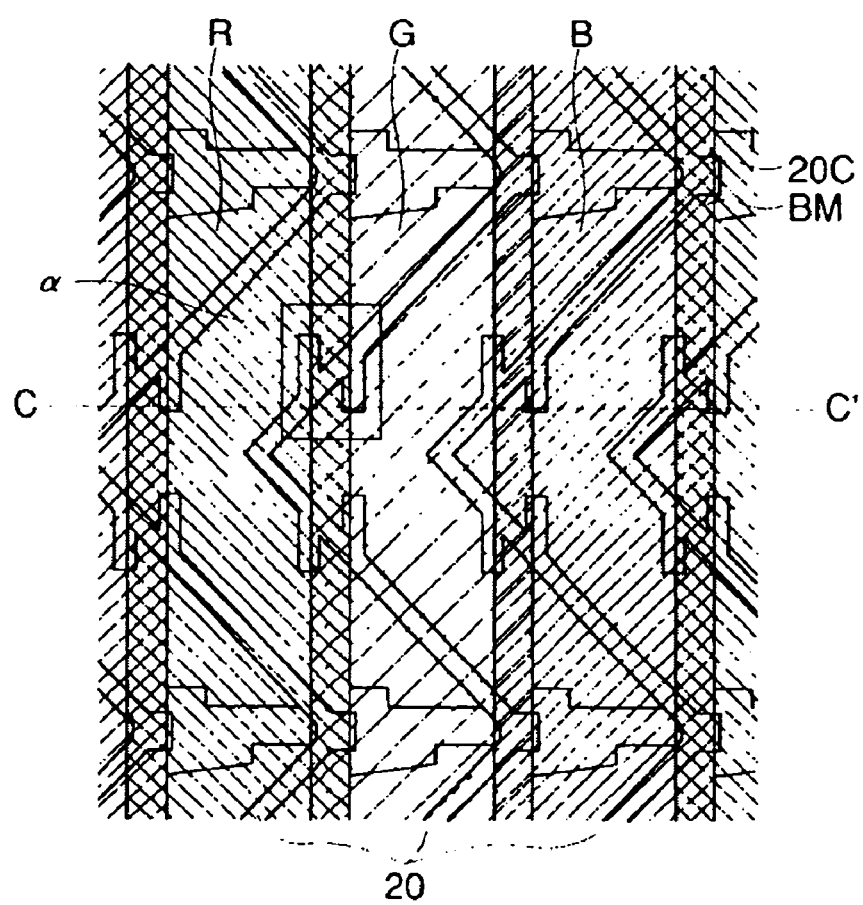
FIGS. 8a and 8b are diagrams showing a problem point of the structure of the spacerless CF shown in FIGS. 5a, 5b and 5c.
Figure 8B:
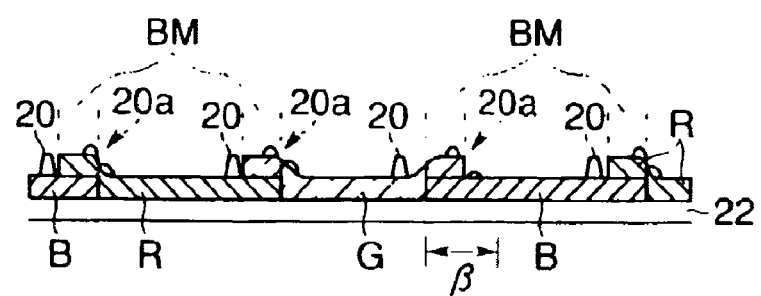

Although FIG. 8a is the same as FIG. 5a shown, FIG. 8a more clearly shows overlaying of the color resins R, G and B in the shaded areas of the CF substrate. FIG. 8b shows a cross sectional view cut at a line C–C' in FIG. 8a. As shown in FIGS. 8a and 8b, the BM is formed by overlapping the color resin layers of the adjacent pixels between the pixels, and the width of the auxiliary protrusion 20a formed along an extending direction of the BM extends from a top of the BM to a top of the color resin layers of the pixel opening portions.

However, the level difference exists at the BM and the color resin layers at the pixel opening portions, and the auxiliary protrusion 20a formed by stepping over this difference may cause a problem in which a pattern thickness becomes too thin at the portion having the level difference or the pattern remains only leaves on the BM but not on the pixel opening portions during its formation process, as shown in a range β in FIG. 8b.

Figure 9:
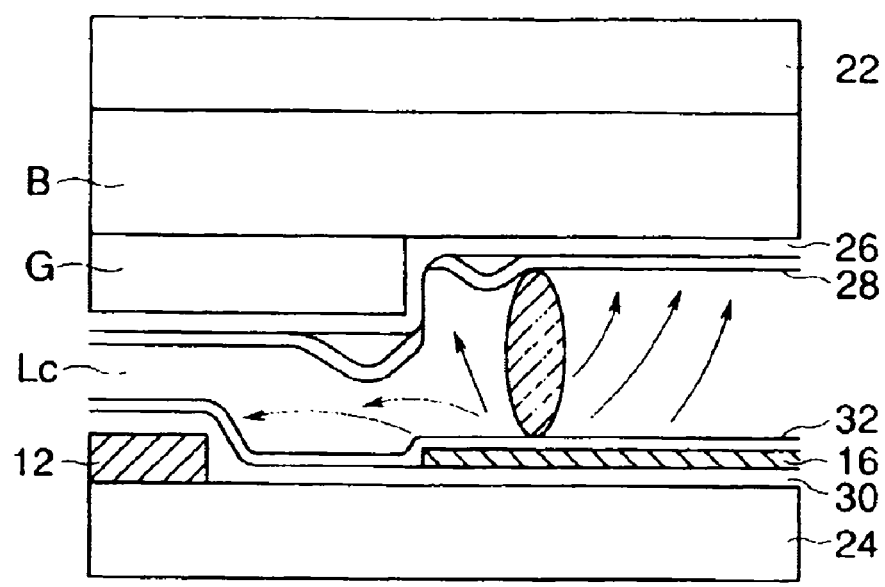
FIG. 9 is a diagram showing a problem point of the structure of the spacerless CF shown in FIGS. 5a, 5b and 5c.

FIG. 9 shows the state in which the CF substrate having the auxiliary protrusion 20a cut at the portion having level difference and the TFT substrate are laminated. When the auxiliary protrusion 20a to be gradually formed from the BM to the pixel opening portions is thinned or disconnected as shown in FIG. 9, the alignment defect area occurs due to an electric field generated between the common electrode 26 on the CF substrate side at the portion having the level difference and the pixel electrode 16 on the TFT substrate side. If this alignment defect area occurs, the display becomes dark or the display irregularities occur, thereby reducing the quality of the display.

In order to solve this problem, in this embodiment, overlaying of color resins to form the BM is not performed at the area the auxiliary protrusion 20a arranged along the end side of pixel electrode 16, and only one layer of the color resin R, G or B is formed, or a color layer is not formed in the formation area.

Figure 10:
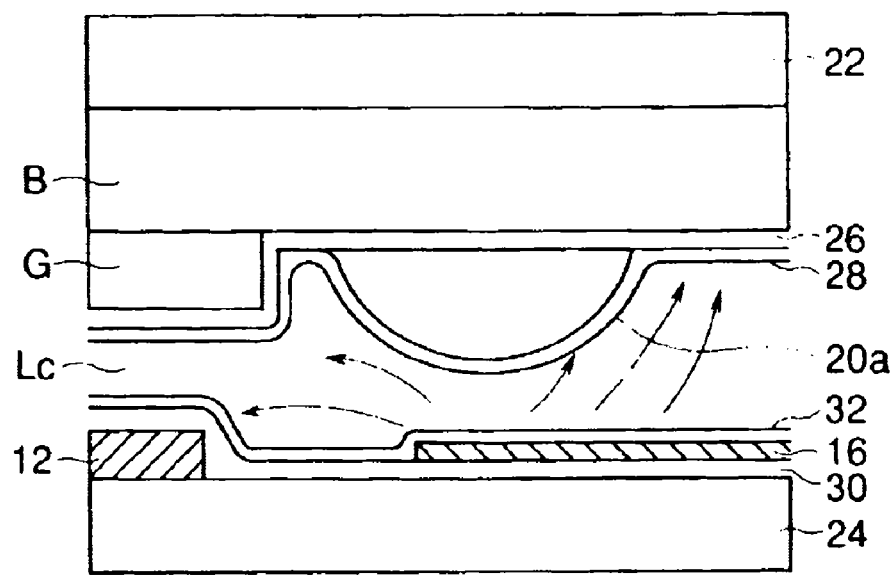
FIG. 10 is a diagram showing a fourth embodiment of this invention.

With reference to FIG. 10 through FIG. 12d, a structure and a fabrication method are described as an example of the liquid crystal display according to this embodiment. FIG. 10 shows a distinctive feature of this embodiment by corresponding to FIG. 9. As shown in FIG. 10, in this example, the level difference at the lower layer in the area the auxiliary protrusion 20a is formed is eliminated by overlaying only one layer (color resin layer B in the diagram) of color resin layer below the auxiliary protrusion 20a. In order to realize this, the end portion of the BM at the lower layer in the area the auxiliary protrusion 20a is formed, in other words, the end portion of the overlaid area of two color resins is moved back to the area between the drain bus line 12 and the pixel electrode 16 without coinciding with the end portion of the pixel electrode 16 of the TFT substrate, and only one color resin layer is formed below the area the auxiliary protrusion 20 is formed.

Figure 11A:
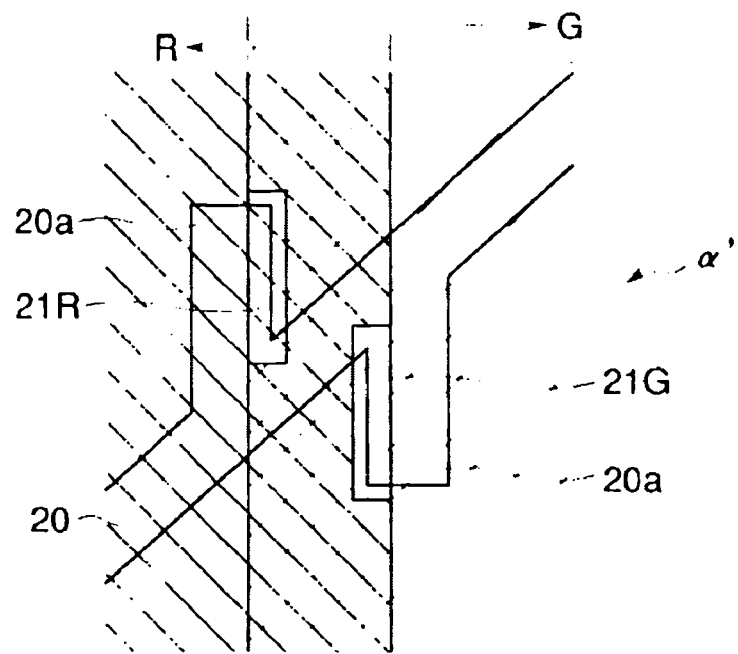
FIGS. 11a and 11b are diagrams showing a cross section at a line C–C' in FIGS. 8a and 8b.
Figure 11B:
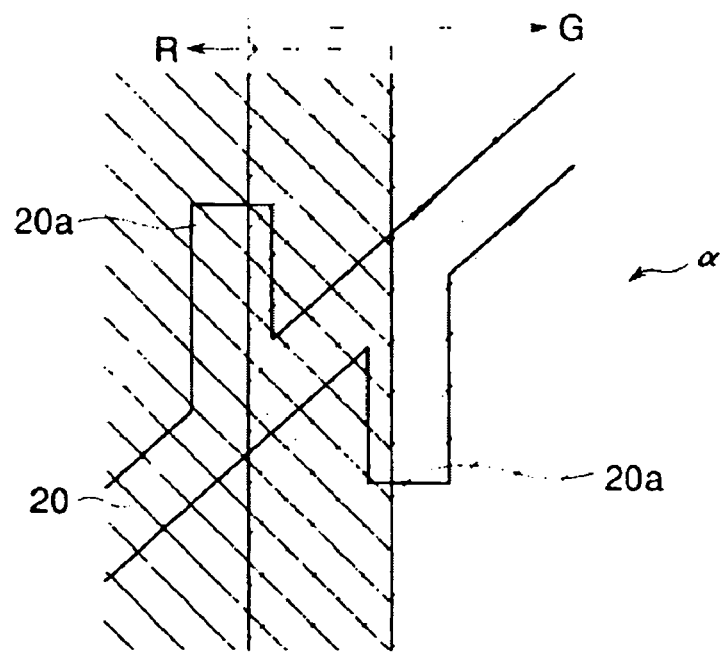

FIG. 11a is an enlarged view showing this example corresponding to the block α shown in FIG. 8a. FIG. 11b shows inside the block α applied as a comparison before this embodiment is applied. As shown in FIG. 11a, a planarized area 21R, where only the color resin layer R is formed, is formed at the lower layer in the area the auxiliary protrusion 20a is formed along the end portion of the color resin R, and a planarized area 21G, where only the color resin layer G is formed, is formed at the lower layer in the area the auxiliary protrusion 20a is formed along the end portion of the color resin G.

Due to the existence of these planarized areas where the level difference is eliminated, the auxiliary protrusion 20a shown in FIG. 10 can be formed to a predetermined thickness and into a predetermined shape. Therefore, even if the alignment defect occurs when the liquid crystal at the end portion of the pixel electrode 16 is affected by a lateral electric field from the drain bus line 12, occurrence of the alignment defect area in the display domain can be prevented. Further, since the auxiliary protrusion 20a arranged in parallel with the end side of the pixel electrode 16 controls the direction of the liquid crystal molecules toward a direction where light leakage does not occur, no shading is required in this area. Furthermore, as shown in FIG. 10, since the level difference in the ITO film of the common electrode 26 produced by overlaying a color resin is apart from the pixel electrode 16 on the TFT substrate, the influence to the display domain caused by an abnormal electric field due to the level difference in the ITO film can be ignored.

Figure 12A:
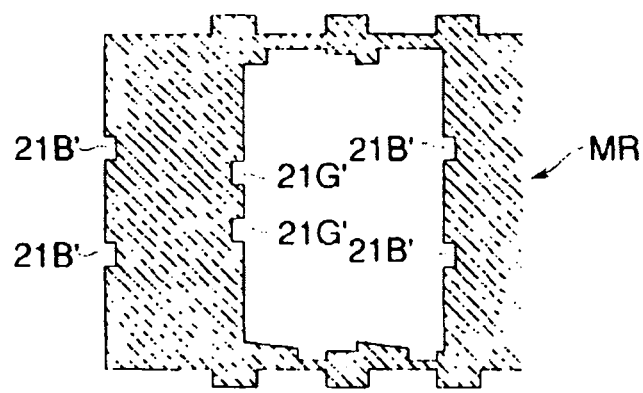
FIGS. 12a, 12b, 12c and 12d are diagrams showing a fabrication method of a liquid crystal display in an example according to the fourth embodiment of the present invention.

Next, with reference to FIGS. 12a through 12d, a fabrication method of the liquid display in which the above-planarized area is formed is described. FIG. 12a shows a part of an MR pattern of the color resin layer R formed at a predetermined position on the CF substrate. The color resin layer R is formed in a hatched portion in the diagram. Notches 21B' and 21G' cut out into a pattern shape of the planarized area are respectively formed at their own predetermined positions on the end side in the vertical direction in the diagram of the color resin layer R in order to form the planarized area.

Figure 12B:
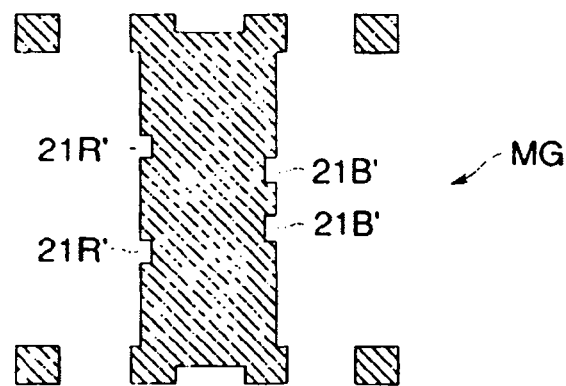
Figure 12C:
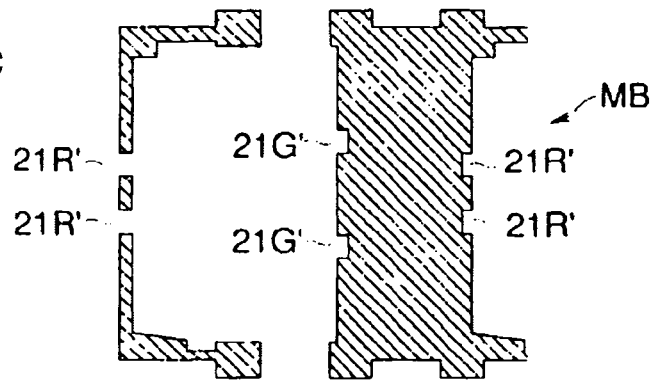

Further, FIG. 12b shows a part of an MG pattern of the color resin layer G formed at a predetermined position on the CF substrate, and the color resin layer G is formed in the hatched portion in the diagram. FIG. 12c shows a part of an MB pattern of the color resin layer B formed at a predetermined position on the CF substrate and the color resin layer B is formed in the hatched portion of the diagram. Notches 21R', 21G' and 21B' cut out into a pattern shape of the planarized area are also formed at their own predetermined positions on end sides in the vertical direction of the diagrams of the color resin layers G and B in order to form the planarized areas.

Figure 12D:
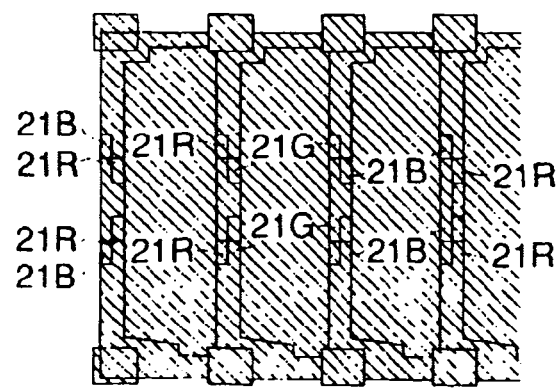

By aligning and patterning each of color resin layers R, G and B according to the patterns MR, MG and MB, as shown in FIG. 12d, the color resins R, G and B are alternately formed at each electrode, and a color filter where planarized areas 21R, 21G and 21B are formed at predetermined positions and the BM are formed. Further, the thickness of each color resin layer is approximately 1.5 μm.

Next, the ITO film with a thickness of 100 nm is deposited by a mask sputtering and the common electrode 26 is formed, and then the protrusion 20 and the auxiliary protrusion 20a for alignment control are formed to 1.5 μm in thickness. Since the auxiliary protrusion 20a is formed on the planarized areas 21R, 21G and 21B, the thickness of the auxiliary protrusion 20a is not reduced nor separated.

A vertical alignment film 28 is formed to approximately 80 nm in thickness on the CF substrate where a main portion has been formed in this manner. On the other hand, a vertical alignment film 32 is coated into 80 nm in thickness on the TFT substrate where the pixel electrode 16, having the gate bus line 10, the drain bus line 12, the TFT 14 and the slit 18 for alignment control, is formed. The TFT substrate and the CF substrate are laminated by using a sealant. At this time, the gap between the two substrates is obtained by a 4-layer pillar of color layers R, G, B and the protrusion layer and is maintained at 4 μm in height. The liquid crystal display is completed by pouring the negative type liquid crystal into this gap and arranging polarizing plates on both sides of the substrates in cross-Nicol.

Figure 13:
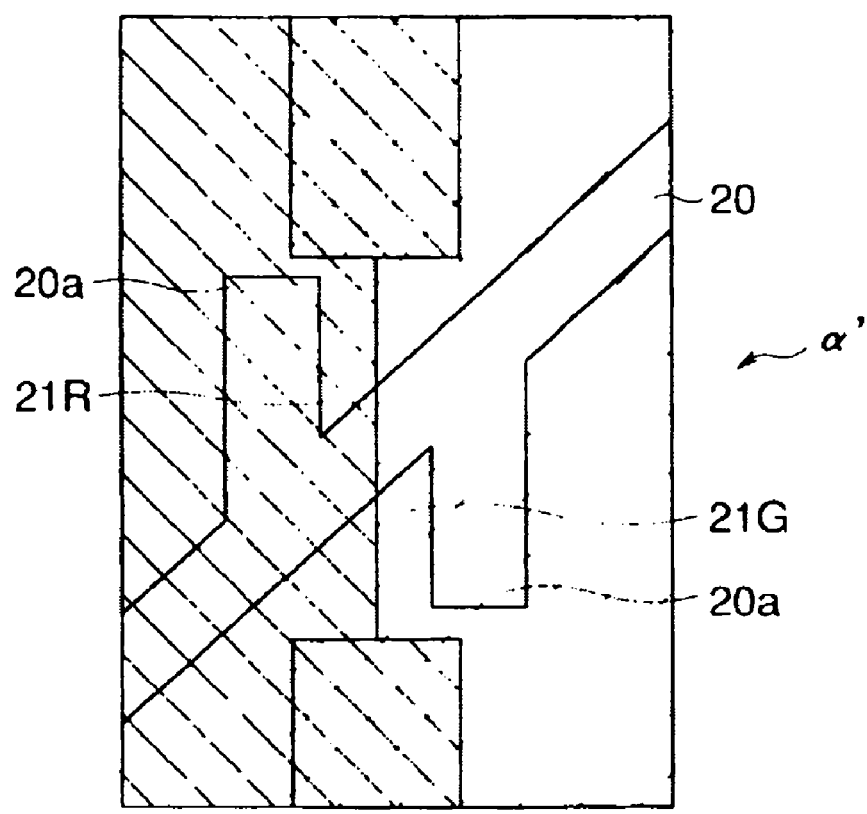
FIG. 13 is a diagram showing an other example according to the fourth embodiment of the present invention.
Figure 14A:
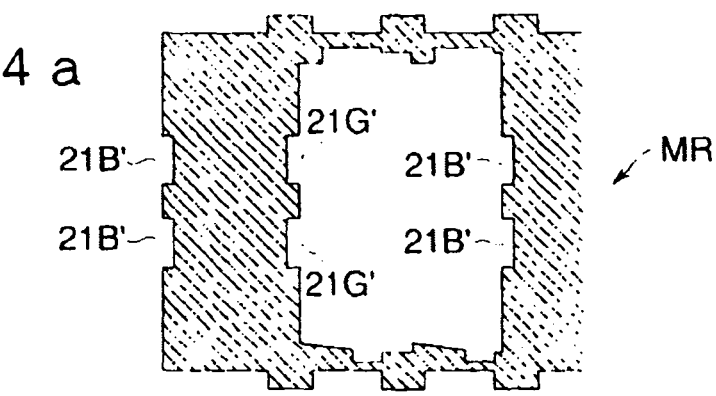
FIGS. 14a, 14b, 14c and 14d are diagrams showing a fabrication method of a liquid crystal display in the other example according to the fourth embodiment of the present invention.
Figure 14B:
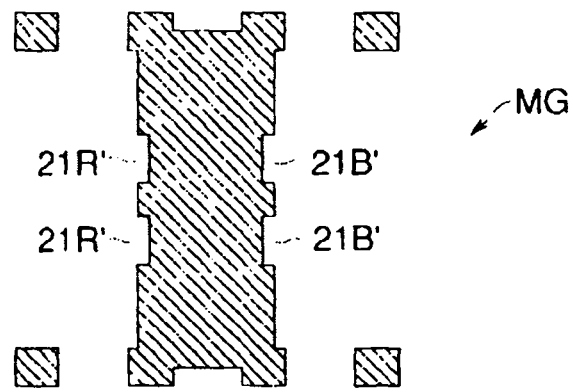
Figure 14C:
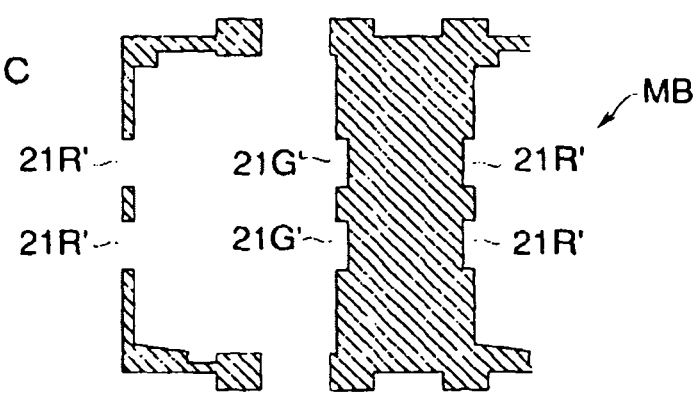
Figure 14D:
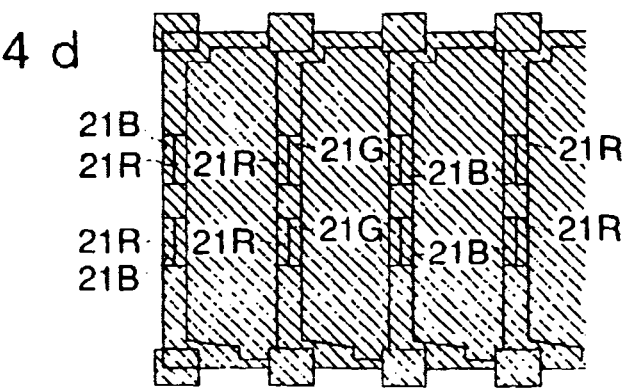

Next, with reference to FIGS. 13 through 14d, another example of the liquid crystal display according to this embodiment is described. In this embodiment, not only the level difference is eliminated at the lower layer in the area the auxiliary protrusion 20a is formed by making only one resin layer below the auxiliary protrusion 20a, but also a planarized area is formed at a lower layer of the protrusion 20 intersecting the BM by expanding the planarized area further.

FIG. 13 is an enlarged view showing this example corresponding to the block a shown in the FIG. 8a. As shown in FIG. 13, a planarized area 21R is formed, where only the color resin layer R is formed, at the lower layer of the formation area of the auxiliary protrusion 20a which is along the end portion of the color resin layer R of the intersection portion between the BM and the protrusion 20. A planarized area 21G, where only the color resin layer G is formed, is formed at the lower layer of the formation of the auxiliary protrusion 20a which is along the end portion of the color resin layer G and of the intersection portion between the BM and the protrusion 20.

Due to the existence of these planarized areas of 21R and 21G where the level difference is eliminated, the protrusion 20 intersecting the BM and the auxiliary protrusion 20a can be formed into a predetermined shape with a predetermined thickness without generating the level difference. Further, a cross section of adjacent to the auxiliary protrusion 20a according to this example is similar to the one shown in FIG. 10.

Therefore, even if the alignment defect occurs when the liquid crystal at the end portion of the pixel electrode 16 is affected by the lateral electric field due to the drain bus line 12, occurrence of the alignment defect area in the display domain can be prevented. Further, since the auxiliary protrusion 20a arranged in parallel with the end side of the pixel electrode 16 controls the direction of the liquid crystal molecule toward a direction where light leakage does not occur, no shading is required in this area. Furthermore, as is the case shown in FIG. 10, since the level difference in the ITO film of the common electrode 26 produced by overlaying a color resin is apart from the end portion of the pixel electrode 16 on the TFT substrate, the influence to the display domain caused by an abnormal electric field due to the level difference in the ITO film can be ignored. Also, since the level difference between the protrusion 20 and the auxiliary protrusion 20a is eliminated, the level difference is eliminated at the ITO film of the common electrode 26, thereby performing the alignment control in this area even more stably. Further, since shading in this area is controlled in the alignment by the auxiliary protrusion 20a and a light leakage does not occur adjacent to the drain bus line 12, a reduction in contrast and the like do not occur.

FIGS. 14a through 14d show a fabrication method of a liquid crystal display in which the above-referenced planarized area is formed. FIG. 14a shows a part of the MR pattern of the color resin layer R formed at a predetermined position on the CF substrate. The color resin layer R is formed in the hatched portion in the diagram. FIG. 14b shows a part of the MG pattern of the color resin layer G formed at a predetermined position on the CF substrate, and the color resin layer G is formed in the hatched portion in the diagram. FIG. 14c shows a part of the MB pattern of the color resin layer B formed at a predetermined position on the CF substrate, and the color resin layer B is formed in the hatched portion in the diagram.

The notches 21R', 21B' and 21G' cut out into a pattern shape of the planarized area are respectively formed at the predetermined positions on end sides in vertical direction in the diagram of the color resin layers R, G and B in order to form the planarized areas.

Since the fabrication method of the liquid crystal display according to this example is similar to the fabrication method described with reference to FIGS. 12a through 12d, the description is omitted.

Figure 15A:
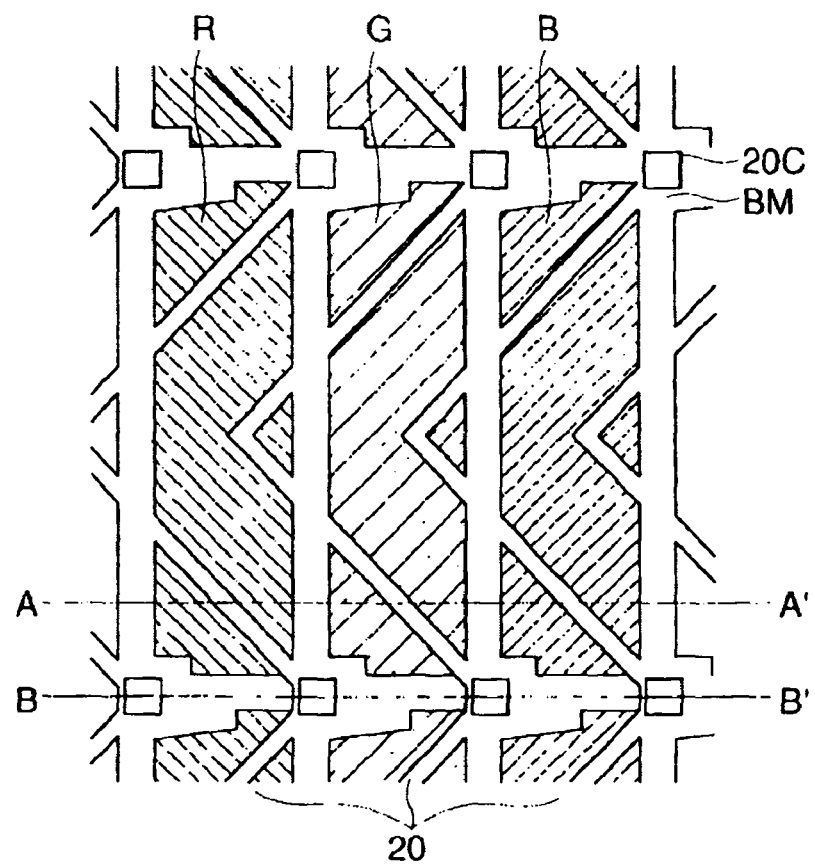
FIGS. 15a, 15b and 15c are diagrams showing a still another example according to the fourth embodiment of the present invention.
Figure 15B:
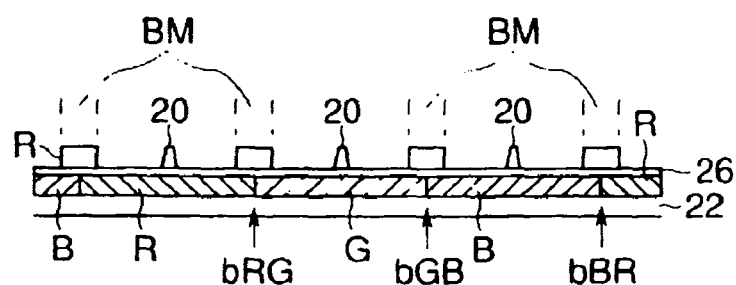
Figure 15C:
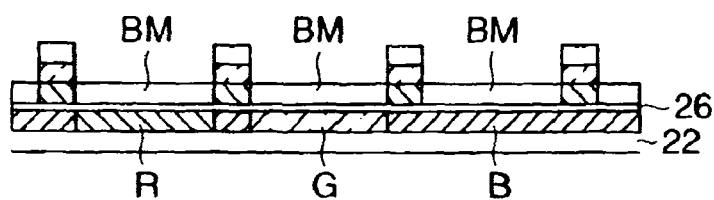

Next, still another example of the liquid crystal display according to this embodiment is described with reference to FIGS. 15a, 15b and 15c. A spacerless CF shown in FIGS. 15a through 15c is an example of a structure of the CF substrate and is similar to the spacerless CF shown in FIGS. 5a, 5b and 5c. However, this structure has a distinctive feature to simultaneously form a shading area by a black resin and the protrusion 20 for alignment control after forming a stripe shape of each color resin and the ITO film of the common electrode 26. According to this structure, no level difference occurs in the ITO film and a preferable display can be obtained without forming the auxiliary protrusion 20a.

The hatched portions in FIG. 15a are the portions where color resin R, G and B are respectively formed and function as a color filter. Other portion functions as the black matrix by overlaying color resins. The ITO film of the common electrode 26 is formed thereon, and the BM and the protrusion 20 are formed on the ITO film. FIG. 15b is a cross sectional view at a line A–A' in FIG. 15a. The common electrode 26 is formed on the surface of each color resin layer and the BM by the black resin and the protrusion 20 are formed on the common electrode 26. Further, FIG. 15c is a cross sectional view at a line B–B' in FIG. 15a. Although the portion excluding the lattice points becomes the BM by overlaying the black resin over a single color resin, resins of three colors are overlaid on the lattice points and a protrusion 20c which is a part of the protrusion 20 by the black resin is further overlaid and the portion of the lattice points functions as the spacer. According to a structure like this, the level difference is eliminated on the whole surface of the substrate of the ITO film of the common electrode 26, therefore the alignment control can be performed even more stably.

Next, a liquid crystal display according to a fifth embodiment of the present invention is described with reference to FIG. 16a through FIG. 17b. This embodiment is according to the fourth aspect of the present invention.

While there are several methods of forming the vertical alignment film on the CF substrate or the TFT substrate, the substrate is generally cleaned before forming the alignment film in any method. Foreign materials attached to the substrate are removed by cleaning, thereby reducing defects due to foreign materials when forming the alignment film. There are a single-panel processing and a batch processing in the cleaning methods. After cleaning in both methods, the substrate is dried by an air-knife drying, a hot water pull-up drying and the like.

As shown in FIGS. 15a through 15c in the aforementioned forth embodiment, when forming the color resins into the strip shape (or an island shape) for forming the color filter, a gap equal to approximately 100 nm–10 µm is formed between adjacent color resins as shown by bRG, bGB and bBR in FIG. 15b. In order to improve the flatness of the CF substrate, a planarization process is performed to fill this gap by coating an overcoat resin on the CF substrate. However, since the planarization process results in an increase in cost, the gap between the color resins may not be filled.

In the liquid crystal display according to the MVA method, when the CF substrate where the gap remains between color resins is used, the protrusion for alignment control is formed as to step over the gap between color resins. Usually, when cleaning the CF substrate before forming the alignment film, cleaning liquid runs along the gap between the color resins during the drying process such as the air-knife drying, the hot water pull-up drying. At this time, if the protrusion is formed as to step over the gap, the cleaning liquid can not run along the gap and remains in the gap portion. If the alignment film is formed on the CF substrate in this state, an area where the alignment film is not coated may occur at the remaining portion of the cleaning liquid, or a vertical alignment nature may be lost. Since the liquid molecules can not be aligned properly in such area, display defect occurs.

So, in this embodiment, the above problem is solved by measures described below.

The first measure is to completely fill the gap by a protrusion material to eliminate the cleaning liquid residue in the gap. As described above, since coating by the overcoating resin results in an increase in cost, in this embodiment, the gap is filled by the protrusion material instead of overcoating. Thus, the gap is eliminated on the CF substrate, thereby realizing uniform drying and avoiding the cleaning liquid residue.

The second measure is to secure the continuous gap as is the case before by selectively removing the protrusion material on the gap. Since a channel for the cleaning liquid is secured on the gap, the equivalent drying effect as the case where the protrusion material is not formed on the gap can be obtained.

By using this embodiment, while suppressing steps of the processes and an increase in cost, the cleaning liquid residue can be reduced during drying. In this manner, occurrence of the area where the alignment film is not coated or the area where the thickness of the alignment film is thin can be reduced, thereby realizing a high-quality liquid crystal display without display defects.

A specific description with reference to examples is described below.

EXAMPLE 1

Figure 16A:
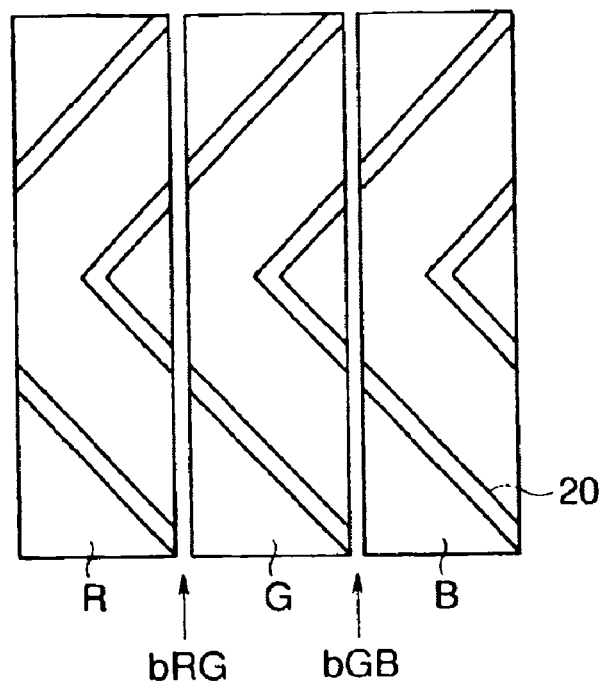
FIGS. 16a and 16b are diagrams showing an example according to a fifth embodiment of the present invention.
Figure 16B:
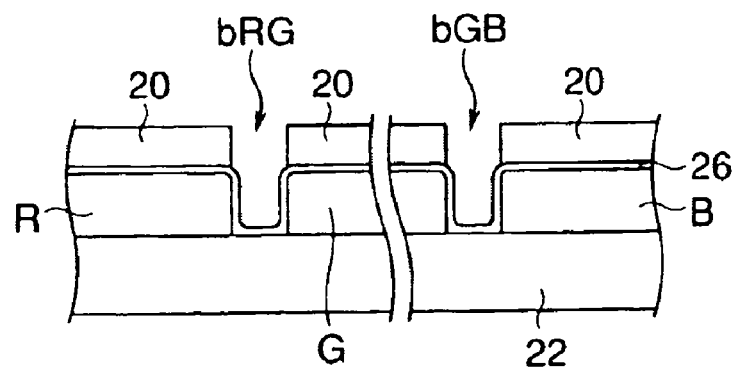

As shown in FIGS. 16a and 16b, color filter resins R, G and B are formed into a stripe shape on the CF substrate 22. At this time, gaps bRG and bGB equal to 10 µm are given between the resins. The common electrode 26 is formed on the CF substrate 22 and the protrusion material is coated to 1.5 µm in thickness. By using a photolithography process, the protrusion 20 is patterned into an intended form. At this time, a photomask on which the pattern to selectively remove the protrusion portions stepping over the gaps bRG and bGB between the resins is drawn is used. Thereby, the CF substrate 22 can be obtained without protrusion materials on the gaps bRG and bGB. The CF substrate 22 obtained in this manner is cleaned and dried by using the air-knife. At that time, the cleaning liquid attached to the CF substrate 22 is blown off by traveling through the gaps bRG and bGB between the resins. Then, the alignment film is formed by using a printing method. In this manner, the CF substrate 22 without the area the alignment film is not coated nor the area the thickness of the alignment film is thin can be formed. Then, the liquid crystal display is fabricated by the normal process. Thereby, a high-quality liquid crystal display without display defects can be obtained.

It will be noted, in this example, the protrusion material on the gaps bRG and bGB is not required to be completely removed. For example, when the width of the gap bRG or bGB is equal to 10 µm, only 5 µm of the protrusion material may be removed and the remaining 5 µm may be left on. In other words, sufficient continuous gaps for traveling the cleaning liquid is required to be secured.

EXAMPLE 2

Figure 17A:
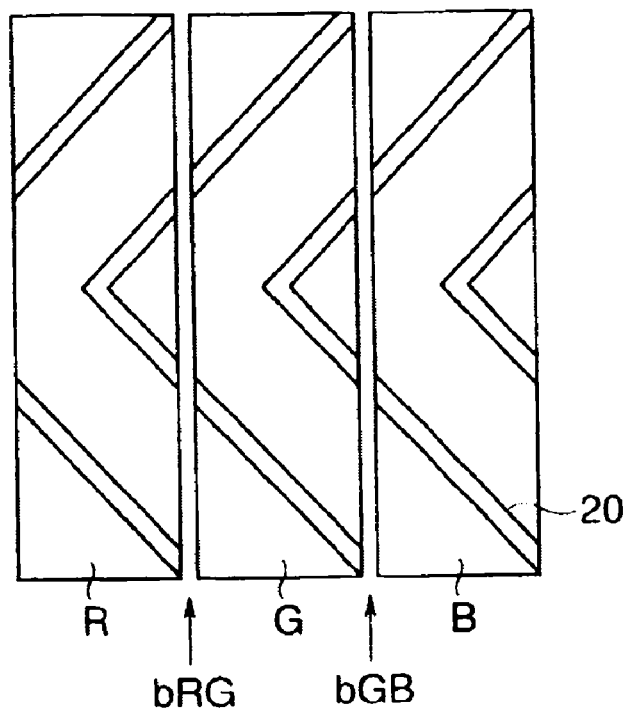
FIGS. 17a and 17b are diagrams showing an other example according to the fifth embodiment of the present invention.
Figure 17B:
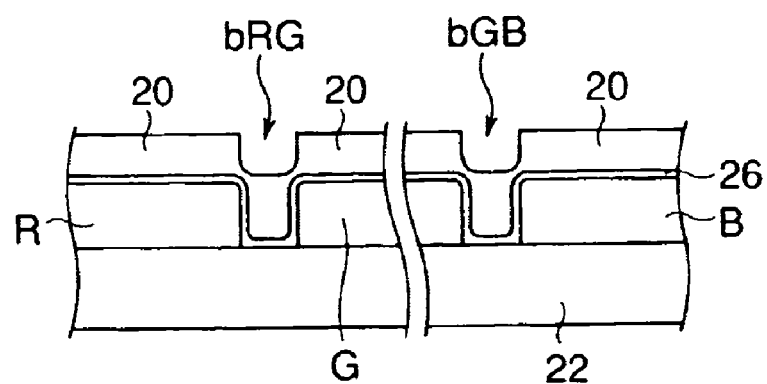

As shown in FIGS. 17a and 17b, the color filter resins R, G and B are formed into a stripe shape on the CF substrate. At this time, the gaps bRG and bGB equal to 10 µm are preserved between the resins. The common electrode 26 is formed on the CF substrate 22 and the protrusion material is coated to 1.5 µm in thickness. By using the photolithography process, the protrusion 20 is patterned into an intended form. At this time, the photo mask on which the pattern to selectively leave the protrusion material in all the gaps of bRG and bGB between resins is drawn is used. Therefore, the CF substrate 22 where the gaps bRG and bGB are completely filled can be obtained. The CF substrate 22 obtained in this manner is cleaned and dried by using the air-knife. At that time, the cleaning liquid attached to the CF substrate 22 is blown off by traveling the surface of the CF substrate 22. Then, the alignment film is formed by using the printing process. The area where the alignment film is not coated or the area where the thickness of the alignment film is thin does not occur on the CF substrate obtained in this manner. Then, the panel is completed by the normal process. Thus, a high-quality liquid crystal display without display defects can be obtained.

It will be noted that, in the above examples 1 and 2, a shape of the color filter resin to be formed is not necessarily required to be the stripe shape. An island shape and other shapes are also allowed.

According to this embodiment, without resulting in an increase in steps of the processes and in cost, occurrence of the area where the alignment film is not coated due to the cleaning liquid residue and the area where the thickness of the alignment film is thin can be reduced, and a very high-quality liquid crystal display with a very high visual field in a preferable alignment state can be fabricated without display defects.

Next, a fabrication method of the liquid crystal display according to the sixth embodiment of the present invention is described with reference to FIG. 18a through FIG. 20. This embodiment is according to the fifth aspect of the present invention. This embodiment is a fabrication method of the CF substrate and relates to a method of forming a spacer pattern and a protrusion pattern for alignment control of the MVA on the color filter with a photosensitive material by using photo processing.

Hitherto, when forming the protrusion pattern and the spacer pattern by a photo processing using the photosensitive material, the photo processing is required to be used in two stages since the difference between the thickness of the protrusion and the thickness of the spacer is great.

Specifically, after coating, pre-baking, exposing, developing and post-baking the photosensitive material (photo resist) on a substrate to be processed in order to form the protrusion pattern, the same photo processing used to form the protrusion pattern is once again repeated to form the spacer pattern this time.

Thus, since the two similar process is performed because the thickness of the protrusion and the spacer is different, the process is lengthened, thereby causing problems of a reduction in yield and an increase in cost. Therefore, if two kinds of patterns having different film thickness can be formed on the substrate to be processed by one photo processing, an increase in manufacturing yield and a reduction in cost can be achieved.

This embodiment is specifically described below based on examples.

EXAMPLE 1

A case using a positive type photosensitive material is described.

Figures 18A, 18B, 18C, 18D, 18E, 18F:
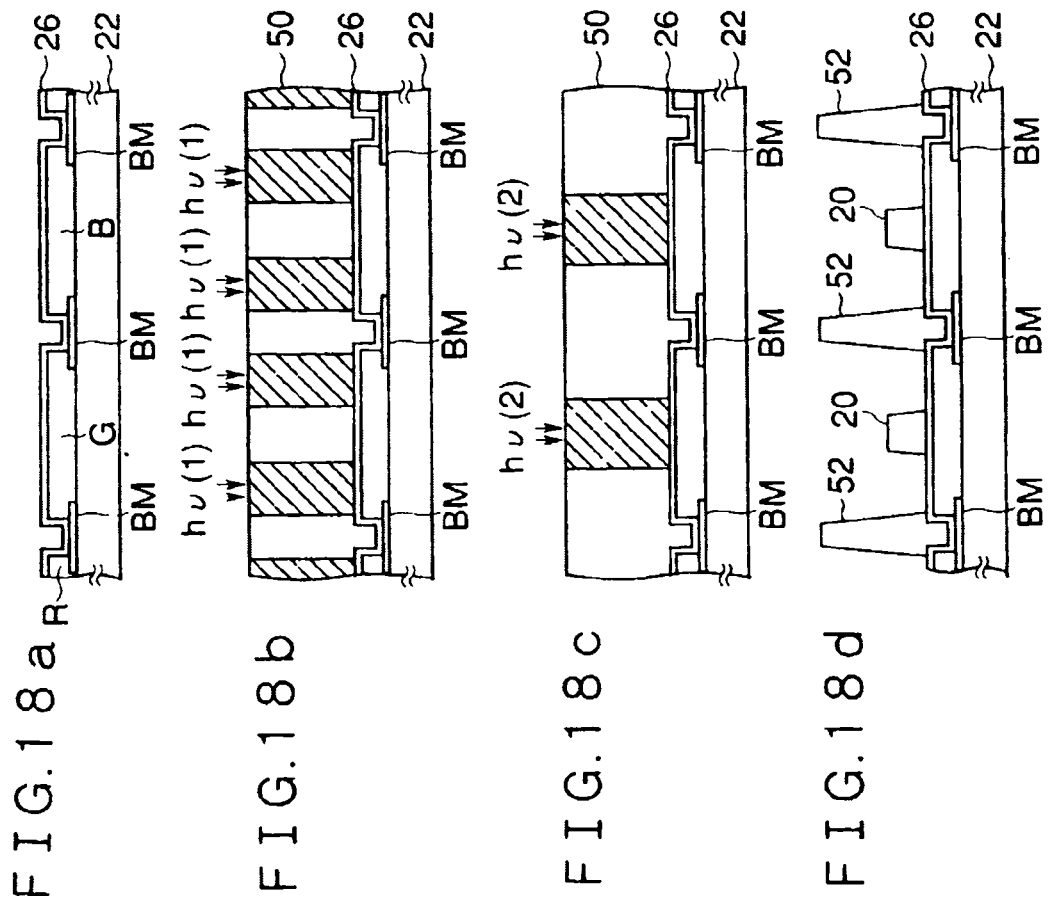
FIGS. 18a through 18f are diagrams showing a cross sectional view of a process describing a fabrication method of a liquid crystal display according to a sixth embodiment of the present invention.

FIG. 18a shows a cross section of the CF substrate 22. A color filter for color resins R, G and B is formed on the CF substrate 22 corresponding to each pixel, and the common electrode 26 is formed on the whole surface. It will be noted that, in this example, a chrome film is used as the BM and the color filter is formed after patterning the chrome film on the CF substrate.

On a surface of the color filter on this CF substrate 22, the positive type photosensitive material 50 is coated by a spinner so that the thickness becomes equal to 4.2 µm after pre-baking. A novolak type photo resist can be used as the positive type photosensitive material 50.

After pre-baking, the CF substrate 22 is put on a substrate stage of a proximity aligner, and a first mask (not shown) and the CF substrate 22 are positioned and exposed based on the BM pattern. A pattern to shade forming locations of the spacer portion and the protrusion portion is drawn on the first mask. However, the width of shading at the forming location of the protrusion is widened by approximately 2 µm against the design value. Exposure is performed at an exposure value of hv(1) which allows the photosensitive material 50 to be sufficiently removed at exposure points by developing (FIG. 18b). In this example, hv(1)=20 mJ/cm$^2$.

Further, by using the proximity aligner, the CF substrate 22 and a second mask (not shown) are positioned based on the BM pattern and exposed. A pattern in which the forming location of the protrusion portion is not shaded is drawn on the second mask. However, the width of an opening at the forming location of the protrusion portion is widened by 3 µm on each side or approximately 6 µm in total against the width of the shading pattern for the protrusion portion on the first mask. Exposure is performed at the exposure value of h v(2) which allows the film thickness of the photosensitive material 50 to remain by approximately 1.5 µm by developing (FIG. 18c). In this example, h v(2) 7 mJ/cm$^2$.

Next, the CF substrate 22 is developed by a developing solution containing 2.38% of TMAH. After developing, the film thickness of the spacer 52 is 4.1 µm and the film thickness of the protrusion 20 is 1.5 µm. After developing, post-baking (curing) is performed and the CF substrate for the MVA where the spacer 52 and the protrusion 20 are formed is completed. The film thickness after post-baking (film thickness measured from the surface of the color filter) is 4.0 µm for the spacer and 1.4 µm for the protrusion portion (FIG. 18d). It will be noted that the order of exposure using the first mask and the second mask can be reversed.

EXAMPLE 2

Next, the case using a negative type photosensitive material is described.

First, the same CF substrate 22 shown in FIG. 18a as in the case using the positive type photosensitive material described above is used.

On the surface of the color filter on this CF substrate 22, a negative type photosensitive material 54 is coated by the spinner so that the thickness becomes equal to 4.2 µm after pre-baking. A novolak type photo resist can be used as the negative type photosensitive material 54.

After pre-baking, the CF substrate 22 is put on a substrate stage of a proximity aligner, and a third mask (not shown) and the CF substrate are positioned and exposed based on the BM pattern. A pattern in which the forming location of the spacer portion is not shaded is drawn on the third mask. Exposure is performed at an exposure value of h v(3) which allows the sufficient photosensitive material 54 to remain at exposure points by developing (FIG. 18e). In this example, hv(3)=20 mJ/cm$^2$.

Further, by using the proximity aligner, the CF substrate 22 and a fourth mask (not shown) are positioned and exposed based on the BM pattern. A pattern in which the forming location of the protrusion portion is not shaded is drawn on the fourth mask. However, the width of an opening at the forming location of the protrusion portion is widened by approximately 4 µm against a design value. Exposure is performed at the exposure value of hv(4) which allows the film thickness of the photosensitive material 54 to remain by approximately 1.5 µm by developing (FIG. 18f). In this example, hv(4)≈7 mJ/cm$^2$.

Next, the CF substrate 22 is developed by a developing solution containing 2.38% of TMAH. After developing, the film thickness of the spacer 52 is 4.1 µm and the film thickness of the protrusion 20 is 1.5 µm. After developing, post-baking (curing) is performed and the CF substrate for the MVA where the spacer 52 and the protrusion 20 are formed is completed. The film thickness after post-baking (film thickness measured from the surface of the color filter) is 4.0 µm for the spacer and 1.4 µm for the protrusion portion (FIG. 18d). Further, the order of exposure using the third mask and the fourth mask can be reversed.

EXAMPLE 3

Next, by using the positive type photosensitive material, a method of forming the spacer 52 and the protrusion 20 by using only one mask and exposing only once is described by using the CF substrate 22 shown in FIG. 18a.

As is the case in the Example 1, the positive type photosensitive material 50 is coated on the surface of the color filter on the CF substrate 22. After pre-baking, the CF substrate 22 is put on the substrate stage of the proximity aligner, and a fifth mask (not shown) and the CF substrate 22 are positioned and exposed based on the BM pattern.

Figure 19:
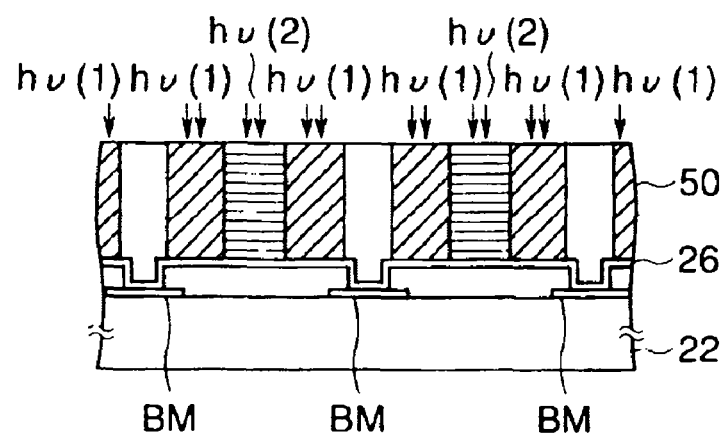
FIG. 19 is a diagram showing a cross sectional view of the process describing the fabrication method of the liquid crystal display according to the sixth embodiment of the present invention.

A pattern which shades the forming location of the spacer is drawn on the fifth mask. At the same time, a pattern in a semi-shaded state is also drawn at the forming location of the protrusion portion to obtain substantially the exposure value of h v(2) when the exposure value of hv(1) is obtained at the unshaded opening portion, and the width of this pattern is widened by approximately 2 µm against a design value. Irradiation is performed at the exposure value of hv(1) which allows the photosensitive material 50 to be sufficiently removed at the exposure points by developing (FIG. 19).

In this way, the spacer 52 equal to 4.1 µm in film thickness and the protrusion 20 equal to 1.5 µm in film thickness shown in FIG. 18d can be simultaneously formed by a single exposure.

EXAMPLE 4

Next, by using the negative type photosensitive material, a method which forms the spacer 52 and the protrusion 20 by using only one mask and exposing once, is described by using the CF substrate 22 shown in FIG. 18a.

As is the case in the Example 2, the negative type photosensitive material 54 is coated on the surface of the color filter on the CF substrate 22. After pre-baking, the CF substrate 22 is put on the substrate stage of the proximity aligner, and a sixth mask (not shown) and the CF substrate 22 are positioned and exposed based on the BM pattern.

Figure 20:
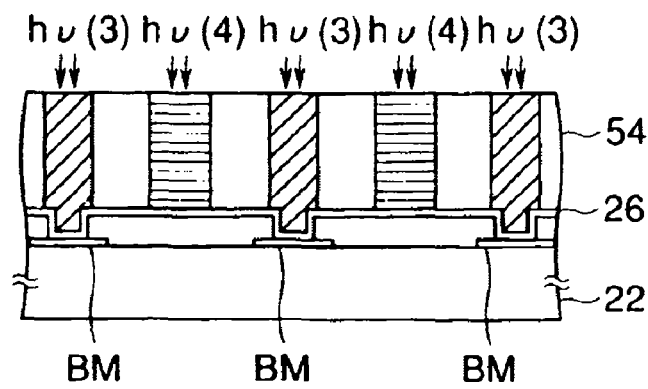
FIG. 20 is a diagram showing a cross sectional view of the process describing the fabrication method of the liquid crystal display according to the sixth embodiment of the present invention.

On the sixth mask, an opening pattern is drawn at the forming location of the spacer. At the same time, a pattern in a semi-shaded state is also drawn at the forming location of the protrusion portion to obtain substantially the exposure value of h v(4) when the exposure value of hv(3) is obtained at the unshaded opening portion, and the width of this pattern is widened by approximately 4 µm against a design value. Irradiation is performed at the exposure value of hv(3) which allows the photosensitive material 54 to sufficiently remain at the exposure points by developing (FIG. 20).

In this way, the spacer 52 equal to 4.1 µm in film thickness and the protrusion 20 equal to 1.5 µm in film thickness shown in FIG. 18d can be simultaneously formed by a single exposure.

As described above, according to this embodiment, the spacer pattern and the protrusion pattern for the MVA can not be formed on the color filter of the substrate by performing one-cycle photo processing. Therefore, a fabrication yield of the color filter substrate for the MVA with the spacer can be improved and also the cost for the device can be reduced.

The present invention is described in detail above. However, the present invention is not limited to the above-described embodiments and deformations are possible to the extent not to deviate the present invention.

It will be noted that, in the present invention, the following structures can also be distinctive features.

(1) During the fabrication process of the CF substrate to be used to fabricate the MVA liquid crystal display, when forming the pattern for the protrusion with the photosensitive material on the color filter by using the photolithography process, the distinctive feature is that the pattern for the spacer is formed with the same photosensitive material by using the same photolithography process.

By coating the photosensitive material (photo resist) during the formation of the protrusion pattern to the film thickness for forming the spacer pattern which is thicker than the film thickness of the protrusion and adjusting the exposure value, the patterns for the protrusion and the spacer can be formed on the CF substrate by a single photolithography process.

Since the patterns for the protrusion and the spacer can be formed by at least one cycle of the photo resist coating, pre-baking, developing and post-baking, the fabrication yield of the CF substrate can be improved and the cost can be reduced.

(2) The distinctive feature is that the exposure values irradiated on the photosensitive material to form the patterns for the protrusion and the spacer are different at the locations to form the protrusion portion and the spacer portion.

Since the protrusion pattern is thinner than the spacer pattern, a desired pattern can not be formed by the same exposure value. Therefore, the exposure values irradiated on the photo resist at the protrusion portion and the spacer portion are made different. Since the coating is the same, the film thickness of the photo resist in the areas forming the protrusion and the spacer become substantially the same film thickness at pre-baking. Therefore, by adjusting the exposure value for forming the protrusion portion and the spacer portion, the film thickness of the protrusion portion and the spacer portion can be selectively varied by the same developing.

(3) The distinctive feature is to use two masks having the different patterns and to expose the photosensitive material on the CF substrate one by one with each mask. By using the two masks and exposing one by one with each mask, the exposure value to form the protrusion portion and the spacer portion can be varied.

(4) This case is when the photosensitive material in the exposure area (the area irradiation energy is transmitted) is the positive type photosensitive material to be removed during the developing process, and the distinctive feature is that, among the two masks used for exposure, the both patterns for the protrusion and the spacer (the pattern shaded by the mask) are formed on one mask and only the pattern for the protrusion (the pattern not shaded by the mask) is formed on the other mask. In this way, the film thickness of each pattern can easily be varied.

(5) The distinctive feature is that the protrusion pattern on the mask where only the pattern for the protrusion is drawn is larger than the protrusion pattern on the mask where both patterns for the protrusion and the spacer are drawn. In order to cope with a situation in which an alignment error occurs in the exposure using the second mask (the second exposure) applied to the area where the exposure using the first mask (the first exposure) is performed, the protrusion pattern on the mask where only the pattern for the protrusion is drawn is made larger (wider) than the protrusion portion on the mask for the first exposure. Deviation in overlaying at the first exposure and the second exposure may occur in spite of every possible measure taken, and there are possibilities that shortness of the protrusion, accuracy of the location of the protrusion and the film thickness of the protrusion portion are affected. However, a measure for this problem can be possible by making the protrusion pattern on the mask with only the pattern for the protrusion larger than the protrusion pattern on the mask with both patterns for the protrusion and the spacer.

(6) The fabrication method of the color filter and the mask used for the fabrication of the color filter are described in which the fabrication method has the distinctive feature in making the width of the protrusion pattern on the mask at the first exposure (exposure using the first mask) wider than the design value in an anticipation of a variation amount when the width of the lines do not comply with the design due to the double exposure (double exposure at periphery of the edge of the protrusion portion). The width of the protrusion does not comply with the design value due to the double exposure at periphery of the protrusion portion when exposure is performed by using the two masks and, moreover, the masks as described in (5) above. Therefore, the width of the protrusion on the mask used at the first exposure is made wider for the peripheral double.

(7) When using the negative type photosensitive material to be removed from the unexposed area (the area irradiation energy is not transmitted) during the developing process, the distinctive feature is that each of the two masks used for exposure forms a pattern on each mask for the protrusion or a spacer by each pattern. When the photosensitive material forming the protrusion and the spacer is the negative type, the two masks used for exposure form the patterns on the mask by each pattern for the protrusion or for the spacer. In other words, the pattern is formed on the CF substrate by the mask with only the protrusion pattern and the mask with only the spacer pattern. When forming the pattern with the negative type photosensitive material, the spacer portion is exposed so that substantially 100% of the photosensitive material remains by developing and the protrusion portion is irradiated at the exposure value sufficient for forming the required film thickness. Thus, the masks used for the two exposures are the mask with only the protrusion pattern and the mask with only the spacer pattern.

(8) The distinctive feature is that patterns at the protrusion and spacer portion are patterned on the same mask and the protrusion and the spacer are formed on the CF substrate by a single exposure by using a mask in which a transmissivity of the pattern for the protrusion on the mask is suppressed so that the exposure value is reduced to some extent during the exposure. In order to form the pattern for the protrusion and the spacer pattern on a single mask (a single exposure), the mask where the transmissivity of the mask portion for the protrusion portion is reduced is used so that the exposure value for the forming area of the protrusion is formed is lower than the actual exposure value. To expose by a single mask (a single exposure), there is a method of making a structure to change the transmissivity (for example, forming a shading film thin) so that the exposure value of the pattern for the portion to be the protrusion can be suppressed to some extent.

(9) The distinctive feature is to use the mask forming the wider pattern width than the design value for the purpose of preventing the pattern width formed on the CF substrate from narrowing by suppressing the transmissivity. The problem that the protrusion portion narrows due to insufficient exposure value can be dealt by widening the width of the protrusion pattern in the mask with a consideration of the narrowed amount for the part to be narrowed.

Next, a fabrication method of the liquid crystal display according to a seventh embodiment of the present invention is described with reference to FIG. 21 through FIG. 25. This embodiment is according to the sixth aspect of the present invention.

While the example using the pillar-shaped spacer for obtaining the predetermined cell gap is described in the above embodiments, a spherical bead made of plastic or glass is also used to realize the gap. Usually, these materials for the spacer are dispersed on either the TFT substrate or the CF substrate during a spacer dispersion process prior to laminating the substrates. Then, both substrates are laminated and further pressed so that the space between the substrates is maintained at the thickness adjacent to a diameter of the spacer material.

Figure 21:
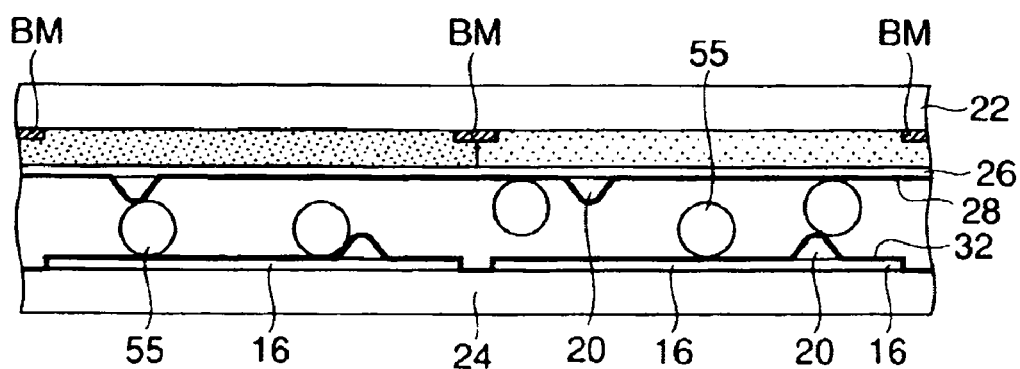
FIG. 21 is a diagram describing an issue to be solved by a seventh embodiment of the present invention.

However, in the MVA liquid crystal display, since the protrusions 20 exist on the surface of both substrates 22 and 24 as shown in FIG. 21, a situation occurs in which a stable cell gap can not be obtained because the spacer 55 makes the wider cell gap thicker by going up on the protrusion 20 or the cell gap is determined outside the protrusion 20.

Further, due to a shifting of the spacer 55 after laminating the substrates 22 and 24, the cell gap easily lacks uniformity in a plane and irregularities in display due to a change in cell gap are generated. Specifically, there is a problem that the display quality is degraded when the spacer 55 is shifted due to a vibration or an impact applied to the liquid crystal display.

Figure 22:
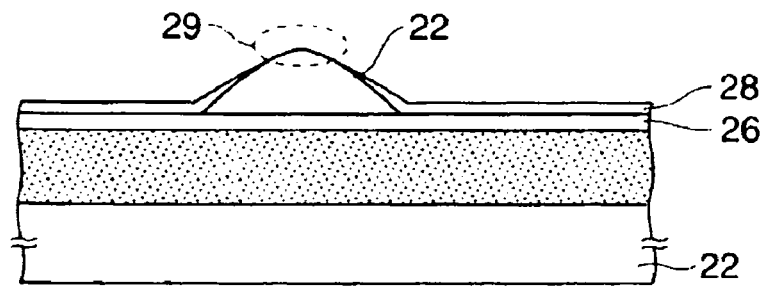
FIG. 22 is a diagram describing the issue to be solved by the seventh embodiment of the present invention.

Furthermore, according to the MVA method, the protrusion 20 is required to be formed on the CF substrate 22 prior to coating the alignment control film. However, due to this formation of the protrusion 20, a phenomena that the alignment control film 28 repels on and around the protrusion 20 as shown in FIG. 22 can occur. Therefore, the alignment control capability at the repelling portion 29 is remarkably reduced, thereby causing a display defect.

In this embodiment, the above problems are solved by the measures described below.

Figure 23A:
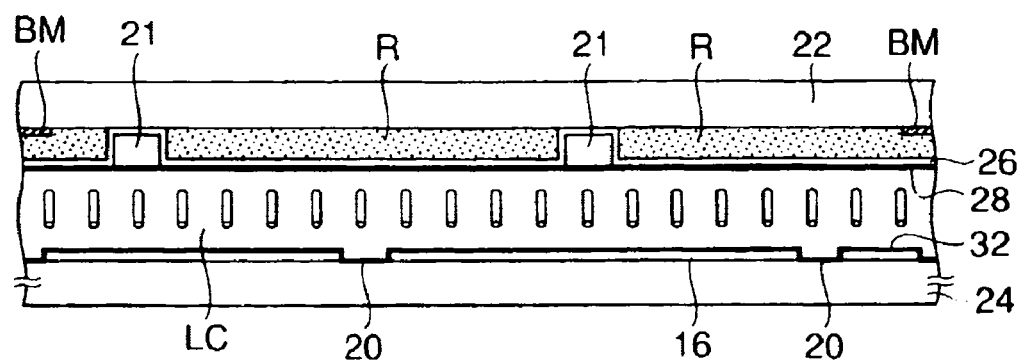
FIGS. 23a and 23b are diagrams showing the seventh embodiment of the present invention.
Figure 23B:
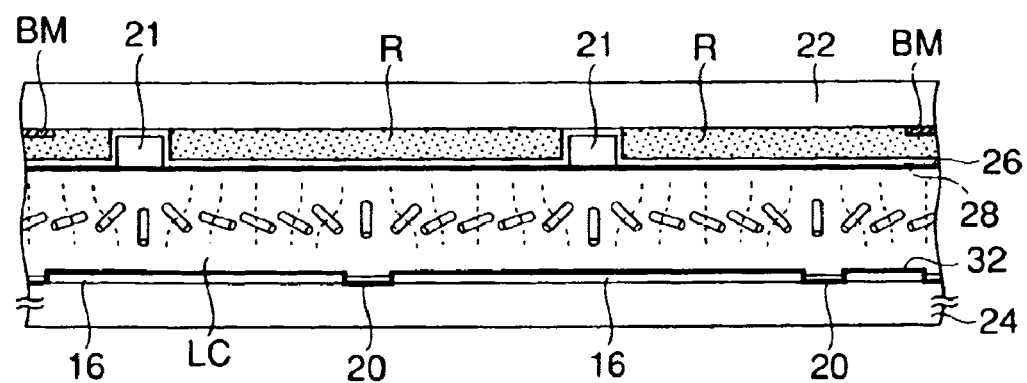

FIGS. 23a and 23b show a structure in a pixel of the liquid crystal display according to this embodiment. FIG. 23a shows a cross section of this liquid crystal display and a state of the liquid crystal LC when no voltage is applied. FIG. 23b shows an alignment state of the electric line of force and the liquid crystal molecules when a voltage is applied. The liquid crystal display according to this embodiment has a distinctive feature that the TFT substrate 24 side is a normal TFT substrate for the MVA, as shown in FIGS. 23a and 23b, forming the slit 20 for alignment control on the pixel electrode 16, but the slit for alignment control or the protrusion 20 is not formed on the CF substrate. Instead, an insulation layer 21 for alignment control is provided.

The BM made of chrome film which decides each pixel is formed on the CF substrate 22 and the color filter is formed by one of the color resins R, G and B corresponding to each pixel. A groove is formed in each color filter in parallel with the slit 20 for alignment control provided on the TFT substrate 24. The common electrode 26 made of the ITO film is formed on the whole surface of the CF substrate 22 and the insulation layer 21 for alignment control is formed on the ITO film in this groove. A vertical alignment film 28 is formed on the surface of the insulation layer 21 for alignment control and on the surface of the color filter. The height of the insulation layer 21 for alignment control from the surface of the substrate is formed to be substantially the same as or lower than the height of the color filter, where the surface of the substrate on the liquid crystal side of the CF substrate 22 is used as a reference.

In this way, the CF substrate 22 with a flat substrate surface can be formed, thereby eliminating the repelling 29 on the alignment film 28, and preventing a reduction in alignment control capability. Further, as the flatness on the surface of the CF substrate 22 improves, variations of the cell gap due to the alignment control pattern can be prevented and a stable cell gap can be obtained.

Figure 24:
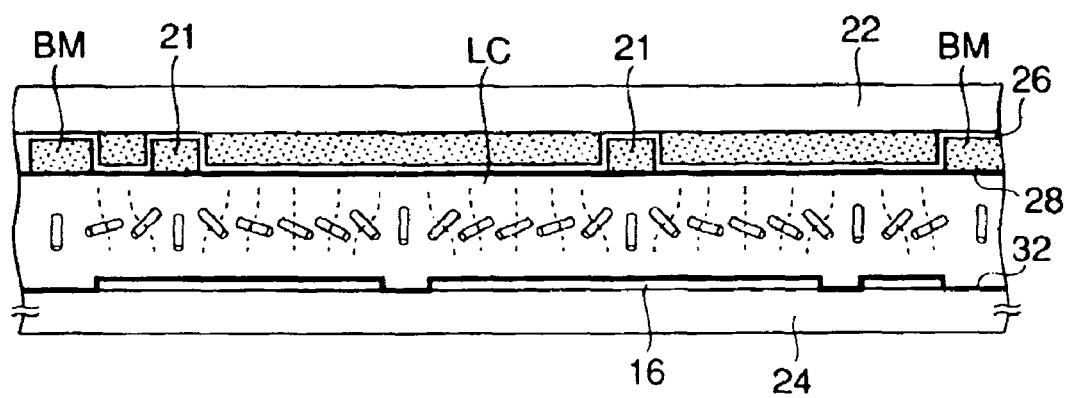
FIG. 24 is a diagram showing the seventh embodiment of the present invention.
Figure 25:
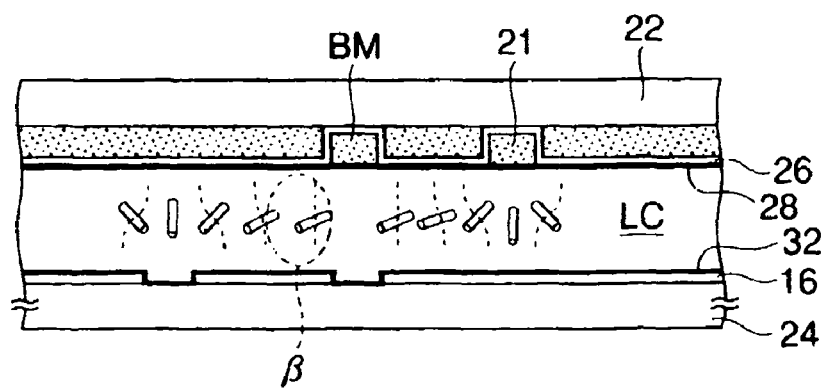
FIG. 25 is a diagram showing an example of an effect according to the seventh embodiment of the present invention.

FIG. 24 shows an example of a deformation of this embodiment. The structure shown in FIG. 24 has a distinctive feature that the BM and the insulation layer 21 for alignment control are formed together by the same material. By forming the insulation layer 21 for alignment control and the BM together by the same material after forming the color filter and the common electrode 26, the insulation layer 21 for alignment control can be formed without an increase in step of the fabrication process.

Further, as shown in FIG. 24, since an oblique electric field can be suppressed by forming the BM with the thick insulation film, the occurrence of the alignment defect β (shown by a dashed-line ellipse) due to the oblique electric field occurring between the pixels in the pixel electrode 16 on the TFT substrate 24 side can be suppressed, thereby improving the quality of the display by suppressing the alignment defect at the end portion of the pixel.

Next, a specific fabrication method of the CF substrate 22 shown in FIGS. 23a and 23b is described. First, the BM is formed by forming a metal film (for example, Cr (chrome)) on the glass substrate and patterning. Next, by using a coating method such as a spin coating method and the like, a photosensitive pigment dispersion type resin R (red) is evenly coated to approximately 1.5 µm in thickness. Next, pre-baking, exposure, developing and post-baking are performed sequentially, thereby forming a red color filter. During this patterning process, the groove to embed the insulation film 21 for the alignment control of the liquid crystal is also formed. By repeating this process for G (green) and B (blue) in the same manner, three colored color filters are formed.

Next, the common electrode 26 is formed by depositing the ITO film to approximately 100 nm in thickness by sputtering. Next, by using the coating method such as the spin coating method, photo resist is evenly coated on the surface of the substrate into substantially the same film thickness as the color filter. Then, the insulation film 21 for alignment control is formed by sequentially performing pre-baking, exposure, developing and post-baking.

The difference in film thickness between the insulation film 21 for alignment control and each color filter is desired to be less than 0.3 µm when the desired cell gap is 4 am. Further, the use of photo resist with a good flatness such as a polyimide type, a novolak type, an epoxy type, an acrylic type or the like is preferred as the photo resist which is the forming material of the insulation film 21 for alignment control.

Furthermore, although Cr is used for the BM in the fabrication method described above, the pattern may certainly be formed by using other materials or methods such as a non-photosensitive resin, a photosensitive resin or dying method and the like. Further, although the photosensitive colored resin is also used to form the color filters, a pattern may certainly be formed by using other materials or methods such as a non-photosensitive resin, a photosensitive resin or dying method and the like. Furthermore, although photo resist is used to form the pattern of the insulation film 21 for the liquid crystal alignment control, other material or method may certainly be used.

Next, a specific fabrication method of the CF substrate 22 shown in FIG. 24 is described. First, by using a coating method such as the spin coating method and the like, photosensitive pigment dispersion type resin B (blue) is evenly coated to approximately 1.5 μm in thickness on the glass substrate. Then, the blue color filter is formed by performing pre-baking, exposure, developing and post-baking. During this patterning process, a groove to embed the insulation film 21 for the liquid crystal alignment control is also formed. By repeating this process for G (green) and R (red) in the same manner, three-color color filters are formed.

Next, the ITO film is deposited to approximately 100 nm in thickness on the CF substrate 22 by sputtering, thereby forming the common electrode 26. Next, by using a coating method such as the spin coating method, negative type photosensitive pigment dispersion type resin (black) is evenly coated on the surface of the substrate to substantially the same film thickness as the color filter. Then, the insulation film 21 for alignment control and the BM are formed by sequentially performing Pre-baking, exposure, developing and post-baking.

Although photosensitive colored resin is also used to form the color filter in the fabrication method described above, a pattern may certainly be formed by using other materials such as non-photosensitive colored resin or other methods such as the dyeing method. Further, although negative type photosensitive pigment dispersion type resin is used to form a pattern for the alignment control insulation film 21 and the BM, the pattern can also be formed by using other materials or methods.

Hitherto, two photo masks are used and two photolithography processes are required in forming the BM for the CF substrate 22 and the insulation film 21 for alignment control. However, the formation method in the above example requires one mask and one photolithography process, thereby simplifying the process. Furthermore, when negative type photo resist is used as the material to form the insulation layer 21 for alignment control and the BM, a pattern without deviations in positioning can be formed by performing a back exposure using the pattern for the color filter as the mask and by self aligning.

As described above, by the insulation layer 21 for alignment control according to this embodiment, the cell gap can be stabilized, disclination can be suppressed, the alignment defect due to the repelling on the alignment film occurring on the protrusion for alignment control can be prevented, thereby improving the quality of display of the MVA liquid crystal display and simplifying the fabrication process.

The present invention is described in detail above. However, the present invention is not limited to the above-described embodiments and deformations are possible to the extent not to deviate the present invention.

Further, in this embodiment, the following structures can also be distinctive features.

(1) The distinctive feature is that when the film thickness of the BM is large, the insulation film for alignment control is not overlaid on the BM.

(2) The distinctive feature is that the film thickness of the BM is more than 0.5 μm.

Next, a fabrication method of the liquid crystal display according to an eighth embodiment of the present invention is described with reference to FIG. 26 through FIG. 31. This embodiment is according to the seventh aspect of the present invention.

This embodiment relates to a structure of a storage capacitor electrode of the MVA liquid crystal display. Although the structure of the storage capacitor electrode at each pixel is not mentioned at all since description is not required for the above embodiments, an improvement of the storage capacitor electrode is described in this embodiment.

Figure 26:
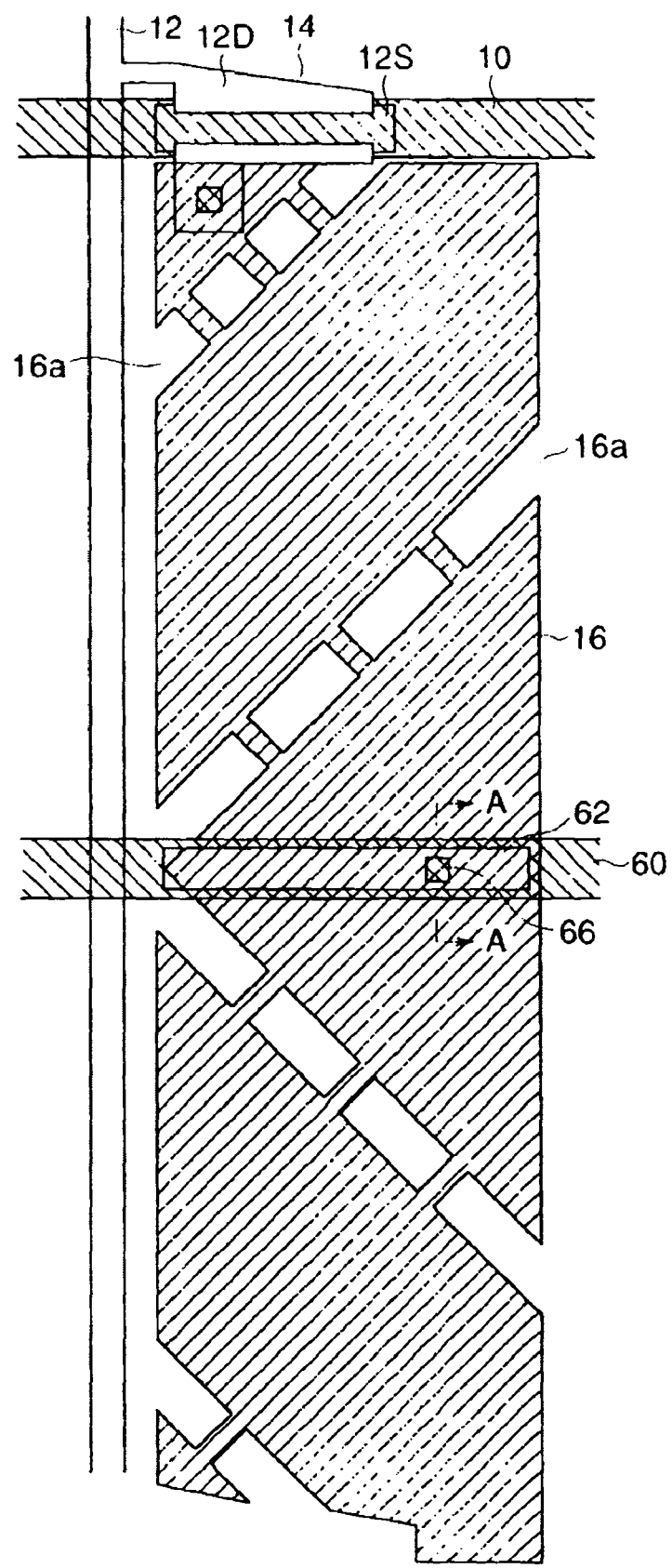
FIG. 26 is a diagram describing an issue to be solved by an eighth embodiment of the present invention.
Figure 27:
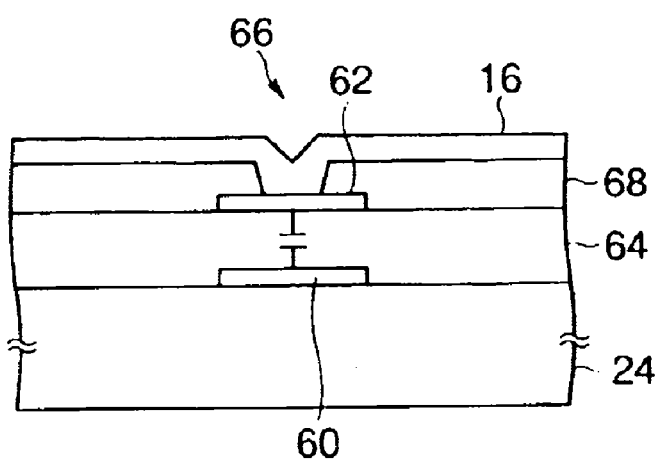
FIG. 27 is a diagram showing a cross section at a line A—A in FIG. 26.

FIG. 26 shows a general structure of the storage capacitor electrode formed on the TFT substrate of the MVA liquid crystal display. Further, FIG. 27 shows a cross section cut at a line A—A in FIG. 26. A gate bus line 10 and a storage capacitor wiring 60 formed simultaneously with a formation of the gate bus line 10 are formed on the TFT substrate 24 in FIG. 26 and FIG. 27. A storage capacitor electrode 62 is formed on the storage capacitor wiring 60 via a gate insulation film 64 and the storage capacitor electrode 62 is connected with the pixel electrode 16 via a contact hole 66 formed on a protection film 68. A storage capacitor is formed by the storage capacitor wiring 60, the gate insulation film 64 and the storage capacitor electrode 62. A slit 16a for the alignment control of the liquid crystal is provided in the pixel electrode 16.

However, when the storage capacitor electrode 62 is formed by such a structure, if the storage capacity is increased to improve voltage holding characteristics of the pixel electrode 16, the areas of the storage capacitor electrode 62 or the storage capacitor wiring 60 must be increased, therefore resulting in a reduction in aperture ratio. Further, the area of the slit 16a for alignment control of the liquid crystal in the pixel electrode 16 becomes the area which should be shaded using the alignment of the liquid crystal. However, since shading by the liquid crystal is not complete, there is some light leakage from the slit 16a, thereby resulting in a reduction in contrast.

In this embodiment, in order to solve the above problems, a part of the storage capacitor electrode is placed just under the slit (or protrusion) 16a for the alignment control of the liquid crystal. In this manner, storage capacity is also formed under the slit 16a. The storage capacity can be increased without a reduction in aperture ratio in the storage capacitor electrode according to this embodiment. Further, in an etching to form the storage capacitor electrode and the gate electrode, since the area to be etched is reduced, the etching time can be reduced.

Furthermore, shading of the protrusion (not shown) for alignment control, formed above the slit 16a for the alignment control of the liquid crystal or the pixel electrode 16, becomes complete by the storage capacitor electrode and contrast is also improved.

Description with reference to specific examples follows below.

Figure 28:
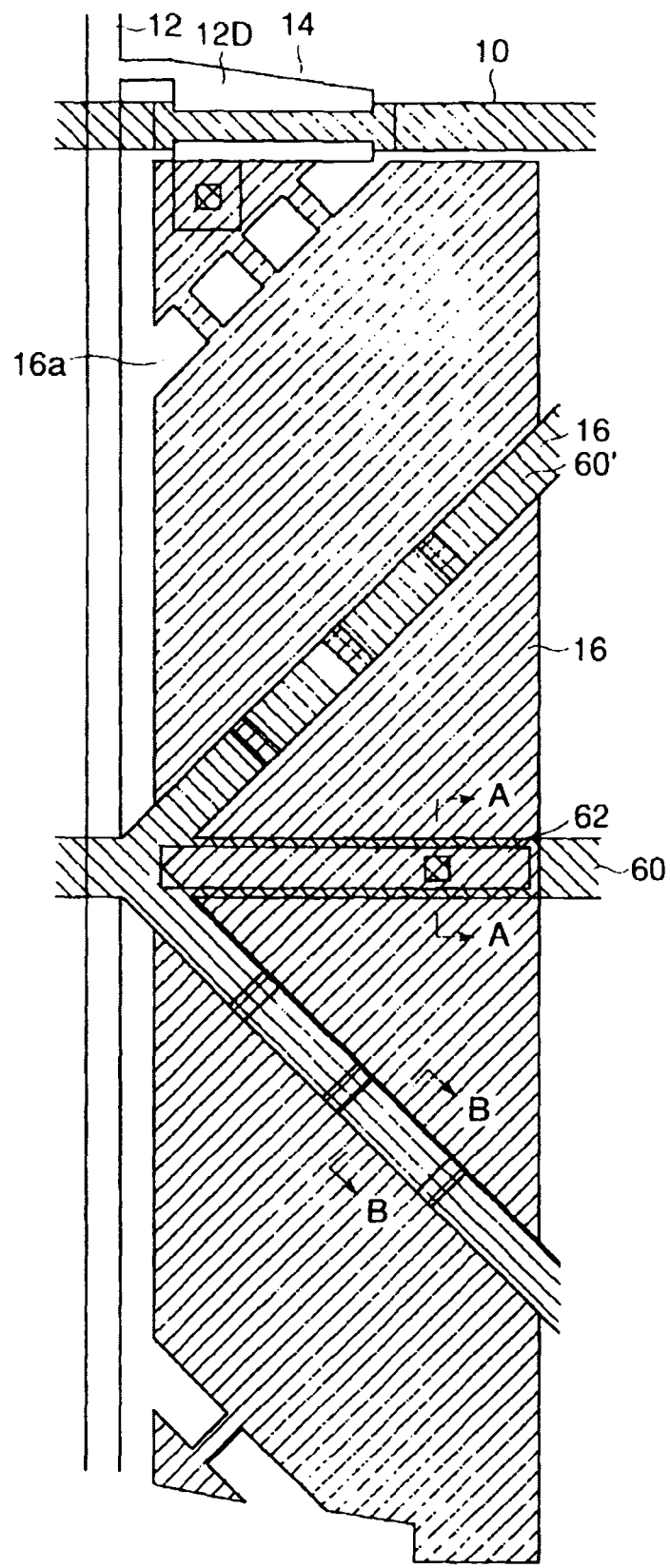
FIG. 28 is a diagram describing the eighth embodiment of the present invention.
Figure 29:
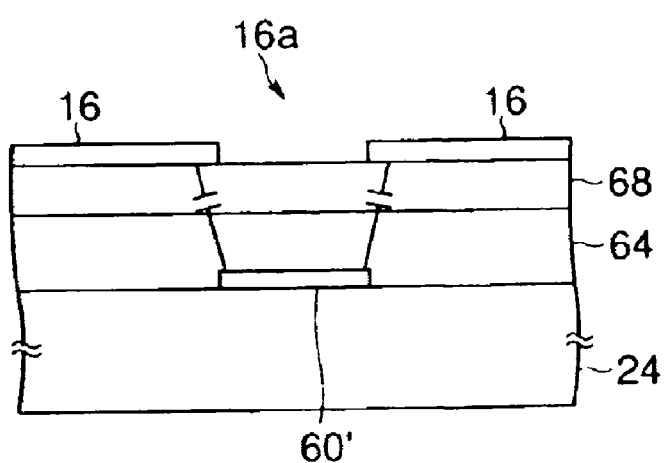
FIG. 29 is a diagram showing a cross section at a line B—B in FIG. 28.

FIG. 28 shows a structure of the storage capacitor electrode formed on the TFT substrate of the MVA liquid crystal display of this example. Further, FIG. 29 shows a cross section cut at a line B—B in FIG. 28. Furthermore, a cross section cut at a line A—A in FIG. 28 is similar to the one in the FIG. 27. The difference from the storage capacitor shown in FIG. 26 is that a storage capacitor wiring 60' electrically connected to and branched off from the storage capacitor wiring 60 is formed just under the slit 16a. An additional storage capacitor is formed by this storage capacitor wiring 60', the gate insulation film 64, the protection film 68 and the pixel electrode 16.

Figure 30:
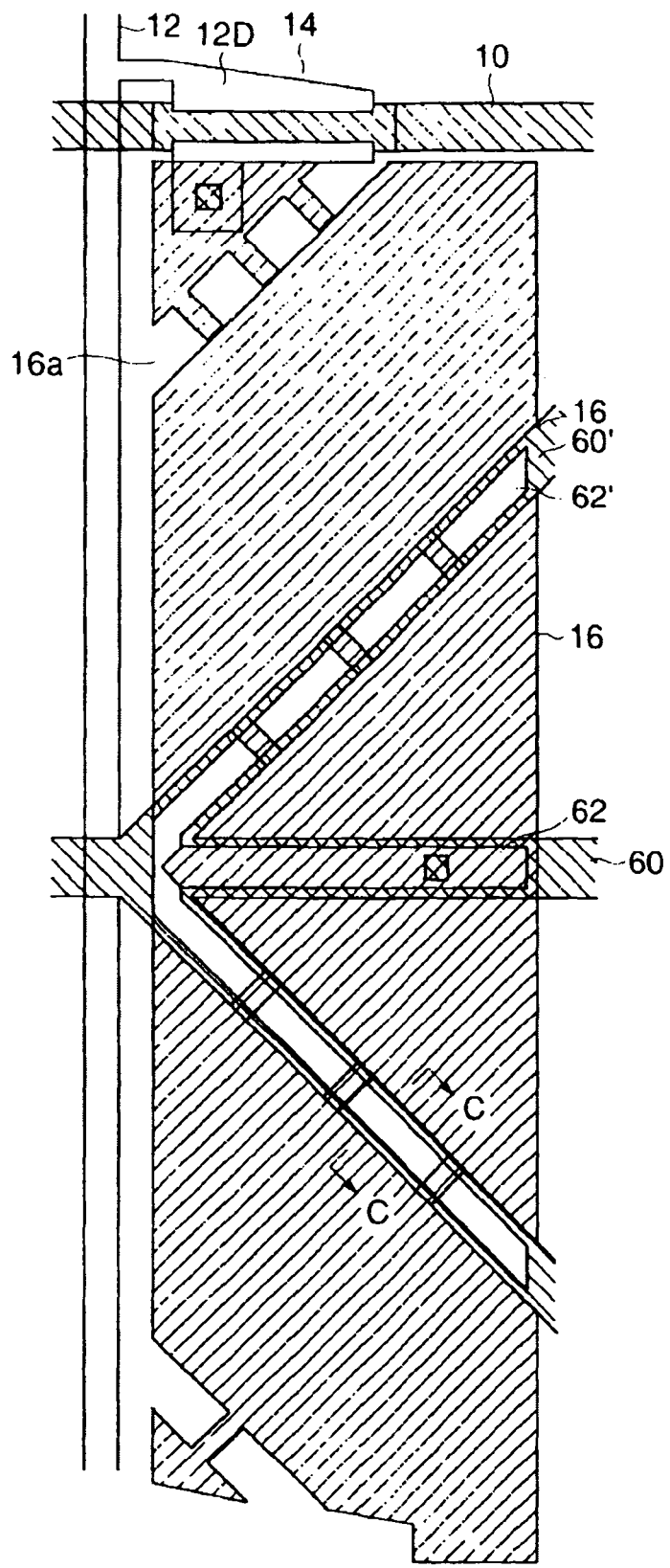
FIG. 30 is a diagram describing the eighth embodiment of the present invention.
Figure 31:
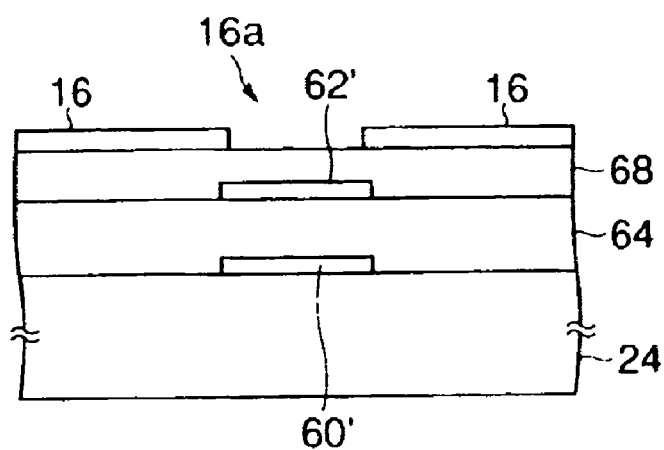
FIG. 31 is a diagram showing a cross section at a line C—C in FIG. 30.

FIG. 30 shows a deformation example of a variation of the structure of the storage capacitor electrode formed on the TFT substrate of the MVA liquid crystal display according to this example. Further, FIG. 31 shows a cross section cut at a line C—C in FIG. 30. The difference from the storage capacitor shown in FIG. 28 is that a storage capacitor electrode 62' is wired between the gate insulation film 64 and the protection film 68 which are located in the area between the storage capacitor wiring 60' formed just under the slit 16a and the pixel electrode 16. The storage capacitor shown in FIG. 31 is formed by the storage capacitor wiring 60', the gate insulation film 64, the storage capacitor electrode 62', the protection film 68 and the pixel electrode 16. In comparison with the structures in FIG. 28 and FIG. 29, larger storage capacity can be obtained in the structures shown in FIG. 30 and FIG. 31.

When structuring as FIG. 30, as in an example, an increased capacity in the area below the slit is equal to 1100 $\mu m^2$. Therefore, while the capacity is approximately 936 $\mu m^2$ according to the structure shown in FIG. 26 even when the width of the storage capacitor wiring becomes from 12 $\mu m$ to 4 $\mu m$, the capacity according to the structure shown in FIG. 30 becomes 2512 $\mu m^2$. Further, while the aperture ratio in the structure shown in FIG. 26 is 46%, the aperture ratio can be increased to 48% in the structure in FIG. 30.

Furthermore, although the above example is described when the slit 16a is formed in the pixel electrode 16, the similar effect can be achieved when the protrusion 20 for alignment control is formed on the pixel electrode 16.

As described above, according to this embodiment, the storage capacity can be increased without a reduction in aperture ratio. Further, since the etching area is reduced, the etching time when forming the storage capacitor electrode 60 and the gate bus line 10 can be reduced. Furthermore, shading in the slit or the protrusion portion for the alignment control of the liquid crystal becomes complete by the storage capacitor electrode, thereby also improving a contrast.

The present invention is described in detail above. However, the present invention is not limited to the above-described embodiments and variations are possible to the extent which does not to deviate the present invention.

Further, in the present invention, the following structures can also be distinctive features.

(1) The distinctive feature is that the storage capacitor wirings 60 and 60' are formed by the same material as and simultaneously with the gate bus line 10.

(2) The distinctive feature is that the storage capacitor wirings 60 and 60' are formed by the material having a shading capability.

As described in detail above, according to the present invention, a liquid crystal display becomes a preferable liquid crystal display which is high in brightness and has a light display characteristic because it is possible not to generate an alignment defect area or not to show the defect area in the display domain even if the defect area occurs.

Further, the liquid crystal display is to have a high fabrication margin and high yield as well as preferable display characteristics, since the display is structured so that the alignment defect area occurs in the portion apart from the display domain even if the defect area occurs and the display defect due to a small deviation during the fabrication does not occur.

What is claimed is:

1. A liquid crystal display comprising:
a CF substrate forming a color filter;
a TFT substrate forming a pixel electrode in each pixel;
liquid crystal having negative dielectric anisotropy sealed between the CF substrate and the TFT substrate; and
a structure provided to at least the CF substrate to control an alignment of the liquid crystal;
a storage capacitor wiring arranged under the structure on a side of the TFT substrate via an insulation film;
wherein a storage capacitor is formed by the storage capacitor wiring, the insulation film and the pixel electrode.

* * * * *

UNITED STATES PATENT AND TRADEMARK OFFICE
CERTIFICATE OF CORRECTION

PATENT NO. : 7,136,140 B1
APPLICATION NO. : 09/611846
DATED : November 14, 2006
INVENTOR(S) : Inoue et al.

It is certified that error appears in the above-identified patent and that said Letters Patent is hereby corrected as shown below:

Col. 30, line 21, delete the following:

"1. A liquid crystal display comprising:
 a CF substrate forming a color filter;
 a TFT substrate forming a pixel electrode in each pixel;
 liquid crystal having negative dielectric anisotropy sealed between the CF substrate and the TFT substrate; and
 a structure provided to at least the CF substrate to control an alignment of the liquid crystal;
 a storage capacitor wiring arranged under the structure on a side of the TFT substrate via an insulation film;
 wherein a storage capacitor is formed by the storage capacitor wiring, the insulating film and the pixel electrode."

and insert the following:

--1. A liquid crystal display comprising:
 a first substrate having a first electrode;
 a second substrate having a second electrode corresponding to a pixel;
 liquid crystal having negative dielectric anisotropy sealed between the first and the second substrates; and
 a structure which is provided on at least the first substrate to control an alignment of the liquid crystal;

UNITED STATES PATENT AND TRADEMARK OFFICE
CERTIFICATE OF CORRECTION

PATENT NO. : 7,136,140 B1  
APPLICATION NO. : 09/611846  
DATED : November 14, 2006  
INVENTOR(S) : Inoue et al.

Page 2 of 2

It is certified that error appears in the above-identified patent and that said Letters Patent is hereby corrected as shown below:

wherein the structure on the first substrate has a linear protrusion structure, an auxiliary protrusion structure extending from the protrusion structure and opposing to each of facing end portions of the second electrode, and a width of the auxiliary protrusion structure wider than a width of the protrusion structure.--

Signed and Sealed this

Twenty-second Day of January, 2008

JON W. DUDAS  
*Director of the United States Patent and Trademark Office*

UNITED STATES PATENT AND TRADEMARK OFFICE
CERTIFICATE OF CORRECTION

PATENT NO. : 7,136,140 B1  Page 1 of 1
APPLICATION NO. : 09/611846
DATED : November 14, 2006
INVENTOR(S) : Inoue et al.

It is certified that error appears in the above-identified patent and that said Letters Patent is hereby corrected as shown below:

Title page item [75]

Under Inventors, delete "Yoshinori Tanaka", "Minoru Otani", "Manabu Sawasaki", "Tetsuya Fujikawa", "Shougo Hayashi", "Kazuhiko Sumi", and "Tomonori Tanose".

Signed and Sealed this

Eighth Day of April, 2008

JON W. DUDAS
*Director of the United States Patent and Trademark Office*